May 17, 1960  W. K. B. KIEL ET AL  2,936,952
CALCULATING MACHINE

Filed July 14, 1952  11 Sheets-Sheet 1

INVENTORS
Wilhelm K.B. KIEL
Ulrich J.R. EICHLER

By
Patent Agent

INVENTORS
Wilhelm K. B. KIEL
Ulrich J. R. EICHLER

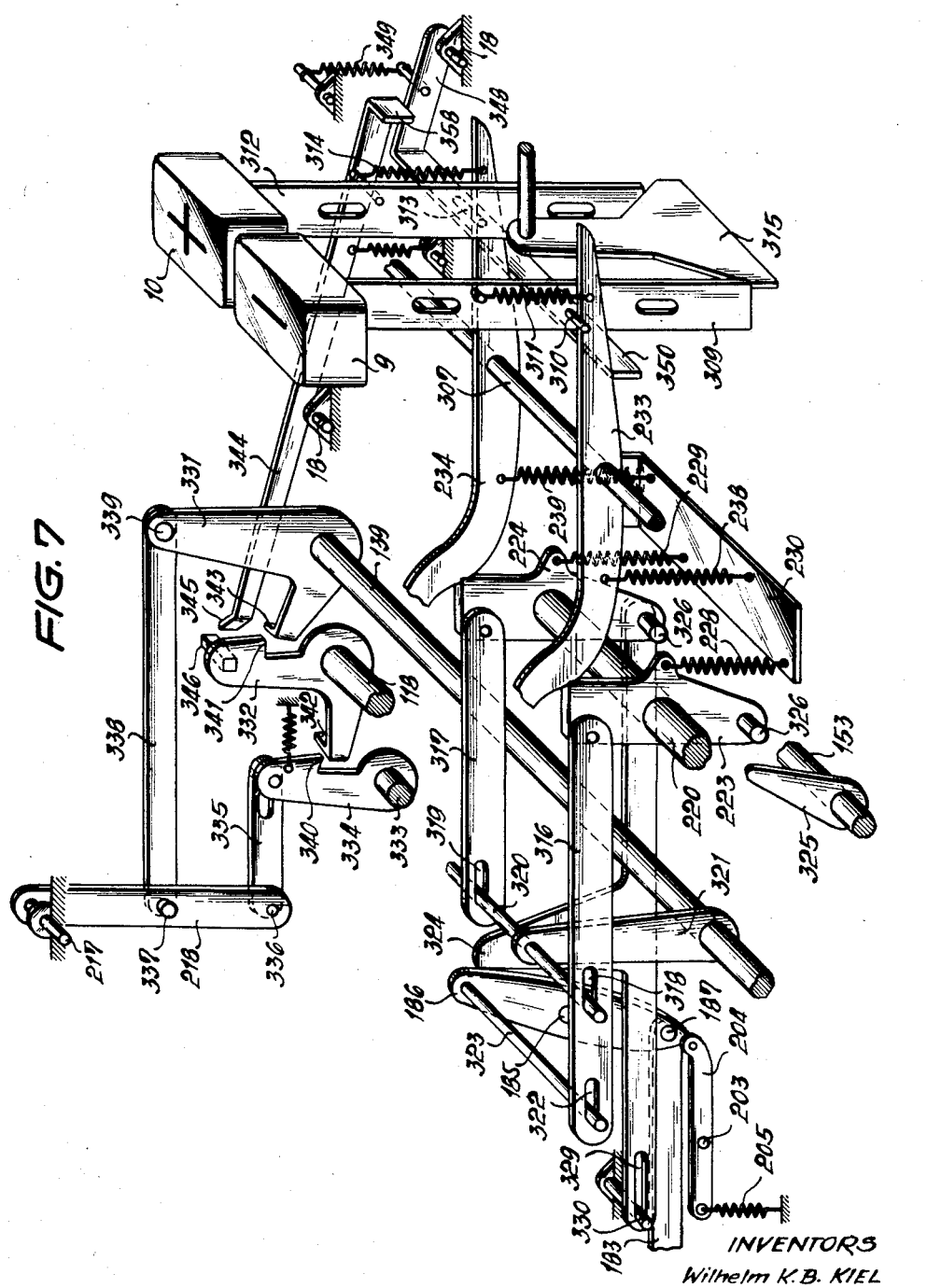

May 17, 1960   W. K. B. KIEL ET AL   2,936,952
CALCULATING MACHINE
Filed July 14, 1952   11 Sheets-Sheet 8
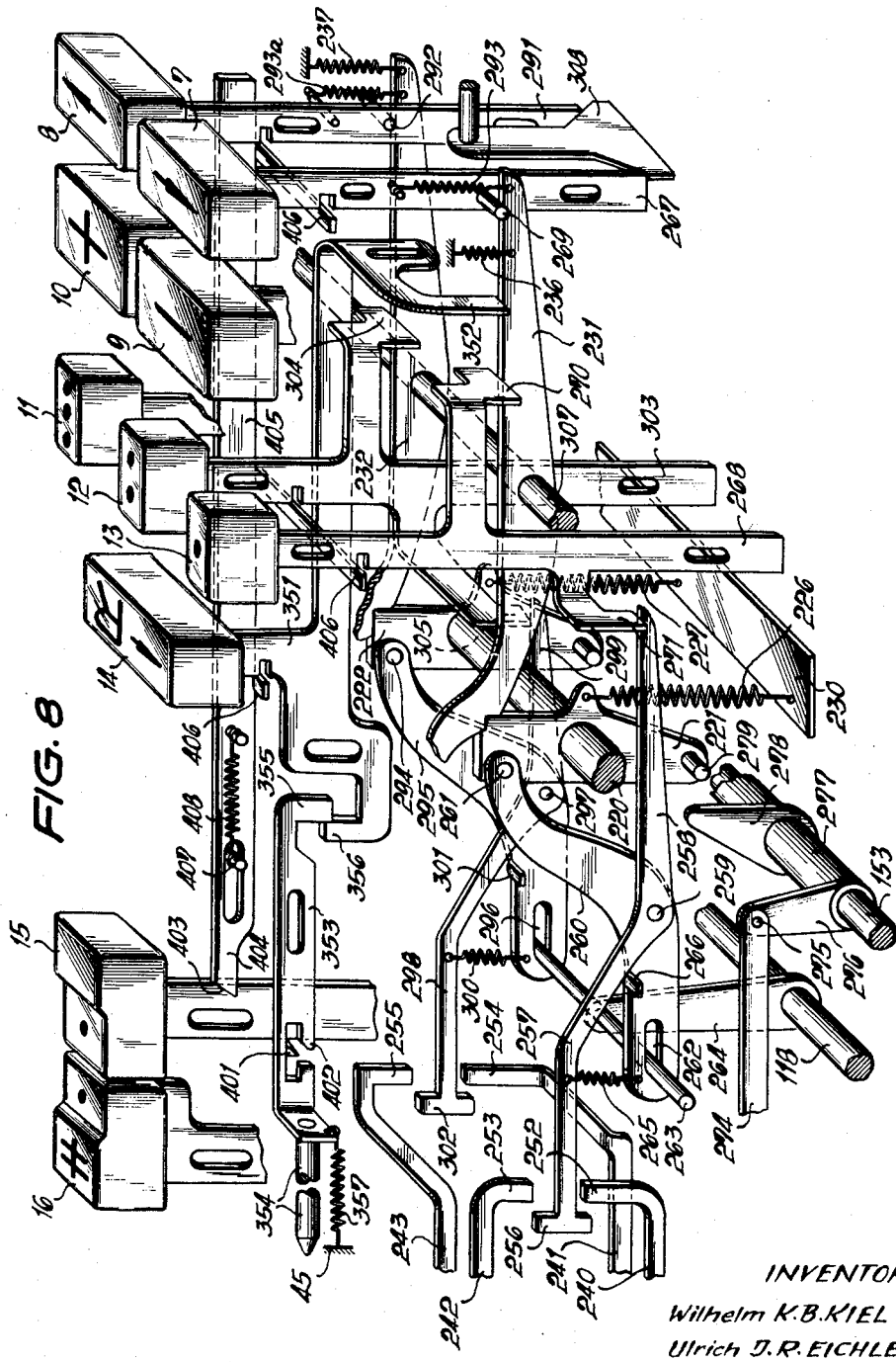
INVENTORS
Wilhelm K.B.KIEL
Ulrich J.R.EICHLER May 17, 1960  W. K. B. KIEL ET AL  2,936,952
CALCULATING MACHINE
Filed July 14, 1952  11 Sheets-Sheet 9
FIG.9
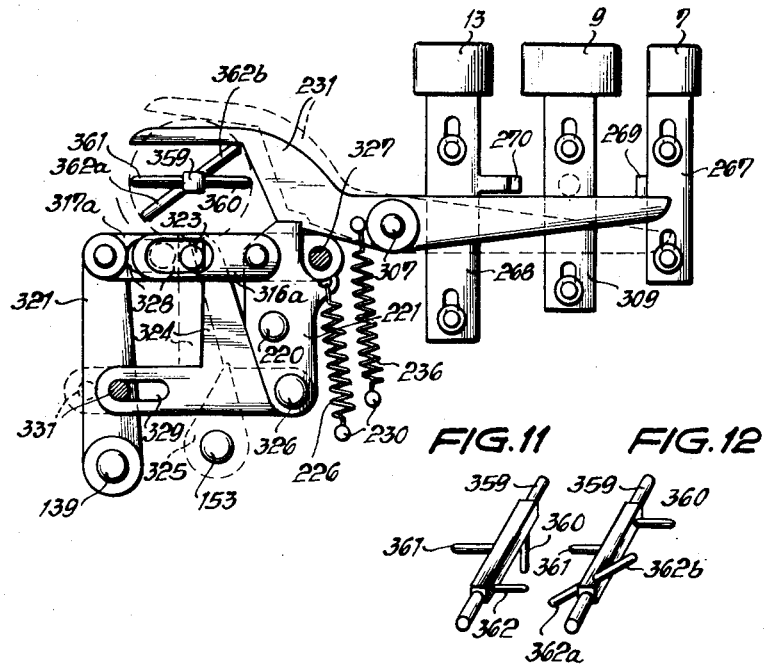
FIG.11  FIG.12
FIG.10
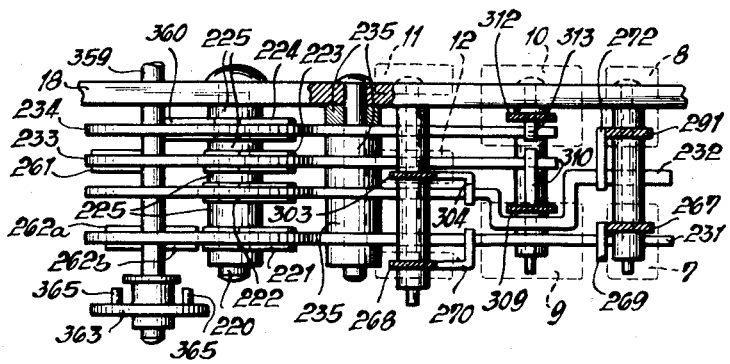
INVENTORS
Wilhelm K.B. KIEL
Ulrich J.R. EICHLER May 17, 1960  W. K. B. KIEL ET AL  2,936,952
CALCULATING MACHINE Filed July 14, 1952  11 Sheets-Sheet 10

INVENTORS
Wilhelm K.B. KIEL
Ulrich J. REICHLER

By
Patent Agent

United States Patent Office 2,936,952
Patented May 17, 1960

2,936,952
CALCULATING MACHINE

Wilhelm K. B. Kiel, Nurnberg, and Ulrich T. R. Eichler, Nurnberg-Ebensee, Germany; said Kiel assignor to Metall-Guss- und Presswerk Heinrich Diehl G.m.b.H., Nurnberg, Germany Application July 14, 1952, Serial No. 298,806

Claims priority, application Germany July 20, 1951

9 Claims. (Cl. 235—63)

The present invention relates to adding and subtracting machines and, particularly, to motor driven four-species calculating machines which in addition to a setting mechanism for striking in numerical values also comprise at least one accumulator and one differential actuator for transferring into the accumulator numerical values entered into the setting mechanism.

Calculating machines of this type are generally provided with function control keys the actuation of which causes the machine, by means of a driving motor, to carry out operations associated with these function control keys. Thus, these machines are provided with two function control keys for addition and subtraction. The actuation of these control keys brings about that a numerical value entered into the setting mechanism, for instance a keyboard, will be transferred through the differential actuator into the accumulator in an additive sense when actuating the plus key, and in a subtractive sense when actuating the minus key.

Four-species calculating machines with a complete keyboard and a movable carriage which, for instance, in addition to at least one accumulator also supports a revolutions counter, possess two further function control keys adapted when actuated, to cause the carriage to move toward the left or the right by one or more decimal orders with regard to the keyboard or the differential actuator.

Furthermore, the calculating machine may be provided with so-called clearing keys adapted by means of a motor to clear the accumulator and revolutions counter and also the setting mechanism. The calculating machine may, additionally be provided with a so-called return key adapted, when actuated, automatically to cause the carriage to return to its normal position. The calculating machine may, furthermore, be provided with function control keys for carrying out more or less composite operations or functions, for instance, automatic division, automatic multiplication, and other operations.

With the functions or operations to be performed by such a calculating machine, there are in part involved similar functions but effective in opposite directions as, for instance, plus and minus calculating, or left and right shift of the carriage, and in part different operations as, for instance, calculating, carriage shift, clearing of counting mechanism, etc.

In order to permit the machine to carry out an operation or sequence of operations corresponding to a function control key, it is necessary to effect certain operational adjustments in the machine so that from the start of the actuation of the function control key up to the end of the effective operation, different working stages can be analytically differentiated in the machine:

(a) The stage of adjusting the machine to the operation to be performed in the course of the actuation of the function control key.

(b) The initiation of the operation to be performed.

(c) The performance of the operation, which operation may in its turn be subdivided into two or more steps which consist in operations of a conditioning and an executing character, respectively.

With a large group of four-species calculating machines, power driven motivation is effected on one hand by throwing in a transmission clutch which, after the selected operation has been performed, automatically disconnects itself, and on the other hand by closing a circuit for the motor to drive the same. Prior to the motor power becoming effective, it is, therefore, necessary, when manually actuating a function control key of the calculating machine, to effect the following working steps:

(a) The adjustment of the machine to the operation to be performed.

(b) The initiation of the operation to be performed, particularly the engagement of the clutch, and additionally, the starting of the motor.

Such an arrangement has the drawback that a relatively great amount of work has to be performed by hand, which can be effected either by relatively long key-strokes or by short key-strokes and relatively large forces.

A further drawback, when working with such calculating machines, is that the operator has to wait for the end of the operation being carried out by the machine before he can initiate the next operation. This is not only inconvenient for the operator but also causes a loss in time.

With calculating machines having a carriage shiftable in opposite direction by means of a gear-shift mechanism, it is known, in order to reduce the manual effort, to use a power-operated control for actuating the two shift keys. Each of these shift keys has associated therewith a control member which locks an actuating member in normal rest position against the thrust of a strong loaded spring. When the control member is released, the actuating member successively carries out the following adjustments: engages a jaw-clutch for left or rightward shift of the carriage, releases a transmission clutch for coupling a driving shaft to a driving mechanism, and closes an electric circuit for a driving motor. In order to reload the spring or power storage means, the driving shaft for driving the shifting mechanism is provided with an eccentric which imparts to two resetting levers a tilting movement effective to restore the released actuating member to normal position where it is relocked by the associated control member which is under the influence of a relatively weak spring.

It is an object of this invention to provide a calculating machine, especially four-species calculating machine, which, while using a power control, will have such power control not only for one type of function but for different types of functions. "Different types of functions" in this connection are intended to mean the various operations occurring in an adding and subtracting machine such as calculating, carriage shift, clearing of the accumulator and counting mechanisms, carriage return, and also compositive operations such as automatic division and the like.

It will be evident that an appropriate solution of this problem underlying the invention has as its objective a reduction in the manual effort required to initiate various machine functions. The solution of this problem, however, is of practical use only when simultaneously a satisfactory interlocking means for the different function control mechanisms is provided so that the machine at any desired and relatively fast issue of commands or faulty commands, will not be blocked.

Accordingly, it is a further object of this invention to provide a calculating machine of the above-mentioned type, in which the control mechanisms for the various operations or functions to be carried out are satisfactorily interlocked.

It is still another object of this invention to provide a calculating machine which, while built up of a relatively low number of parts, is foolproof.

Another object of this invention consists in the provision of a calculating machine which will make it possible to store the machine operations keyed into the machine so that the machine cannot be blocked by actuation of function control keys simultaneously or in rapid sequence, but will successively and under certain circumstances in a predetermined sequence carry out the functions corresponding to the actuated function control keys.

It is still another object of this invention so to construct a calculating machine, in which power control members are grouped together in a power control center, that the function control keys are spatially grouped together in easily operable operating groups.

It is a still further object to provide a calculating machine of the above-mentioned type with function control templates, for instance, in form of control shafts provided with pins, in which the function control templates are adapted to act upon the control members of the power control center in such a manner that a certain sequence of functions, for instance, an automatic division, can automatically be carried out by the calculating machine after actuation of a function control key, so that a rather small technical expenditure will suffice.

These and other objects and advantages of the invention will appear more clearly from the following specification in connection with the accompanying drawings, in which:

Figure 7 is a perspective diagrammatic view of a part of the power control center which concerns the plus and minus setting.

Figure 8 is a further view of a part of the power control center, likewise in perspective diagrammatic representation, which supplements Figure 4.

Figure 9 is a side view of the power control means provided in the calculating machine and grouped together to a central station.

Figure 10 is a top view of the power control center.

Figure 11 is a first embodiment for a control template according to the invention intended for automatic division.

Figure 12 is a second embodiment for a control template intended for automatic division.

Figure 1:
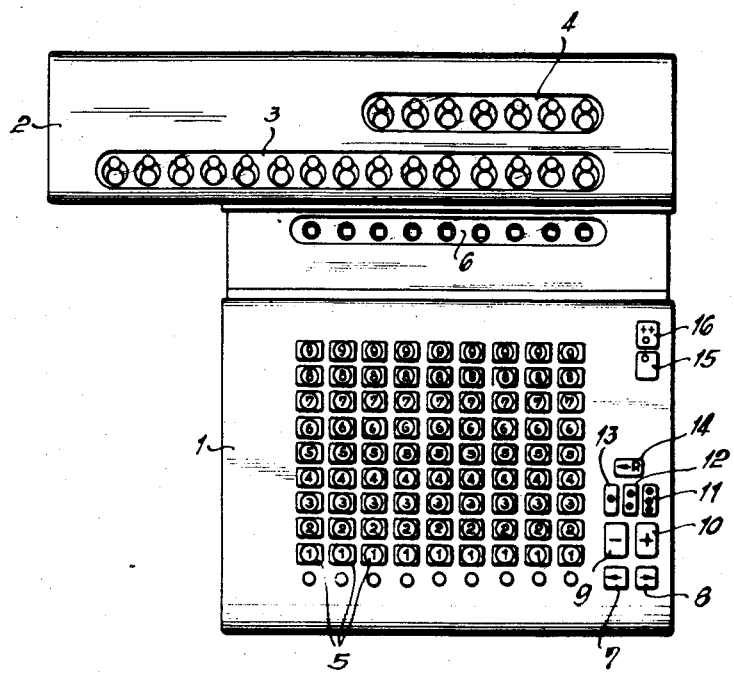
Figure 1 shows the entire calculating machine seen from the top.

Prior to referring to the drawing in detail, it may be mentioned that the embodiment shown in the drawings concerns an electro-motor driven four-species calculating machine in which an accumulator and a revolutions counter are provided in a movable carriage adapted to be shifted denominationally by the driving motor. The machine has furthermore as setting mechanism a keyboard, while a differential actuator comprising cylinders having stepped teeth serves for transferring the numerical values entered into the keyboard. The described calculating machine is furthermore provided with functional control keys on the stationary machine frame for clearing the accumulator and the revolutions counter in each position of the carriage. The calculating machine also includes a return key which when actuated causes the carriage automatically to return to its normal position. Finally, the calculating machine shown in the drawings also comprises a device for automatically carrying out division calculations.

*Structural arrangement of the differential actuator*

Referring now to the drawings in detail, and Fig. 1 thereof in particular, the structure shown therein comprises the stationary machine frame 1 on which there is arranged the carriage 2 which is adapted to be moved by decades. The carriage 2 supports an accumulator 3 of which Fig. 1 only shows the sight openings for the number discs and the handles for manually setting the number discs. The reference numeral 4 represents a so-called revolutions counter also supported on the carriage. Keys of a setting mechanism protrude beyond the upper surface of the stationary machine frame. These keys are grouped together in ordinal banks 5, each of which comprises the Figures 1 to 9. The reference numeral 6 represents an indicator mechanism for indicating the number values entered into the individual key banks.

The right-hand side of the stationary machine frame 1 is occupied by functional control keys of which the key 7 is adapted to initiate the shifting of the carriage toward the left, while the key 8 is adapted to initiate the shift of the carriage toward the right. The key 9 serves for initiating minus calculations, the key 10 serves for initiating plus calculations, and the key 11 is adapted to clear the setting mechanism. The key 12 serves for clearing the revolutions counter, while the key 13 is adapted to clear the accumulator mechanism. When actuating the function control key 14, the carriage 2 returns into the normal left hand position shown in the drawings. The key 15 together with the key 16 are the function control keys for bringing about an automatic division.

Figure 2:
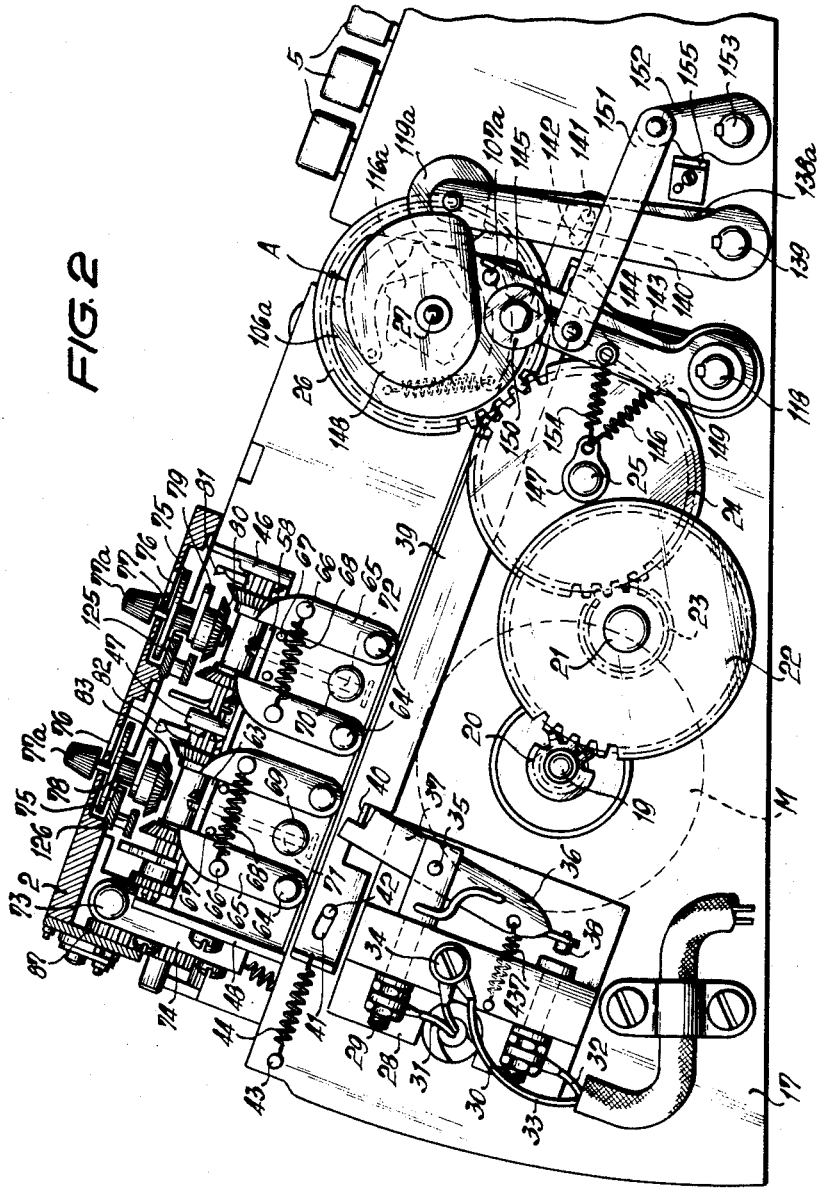
Figure 2 is a side view of the machine when looking from outside upon the left frame wall of the machine, the carriage being sectioned while the machine casing has been omitted.
Figure 3:
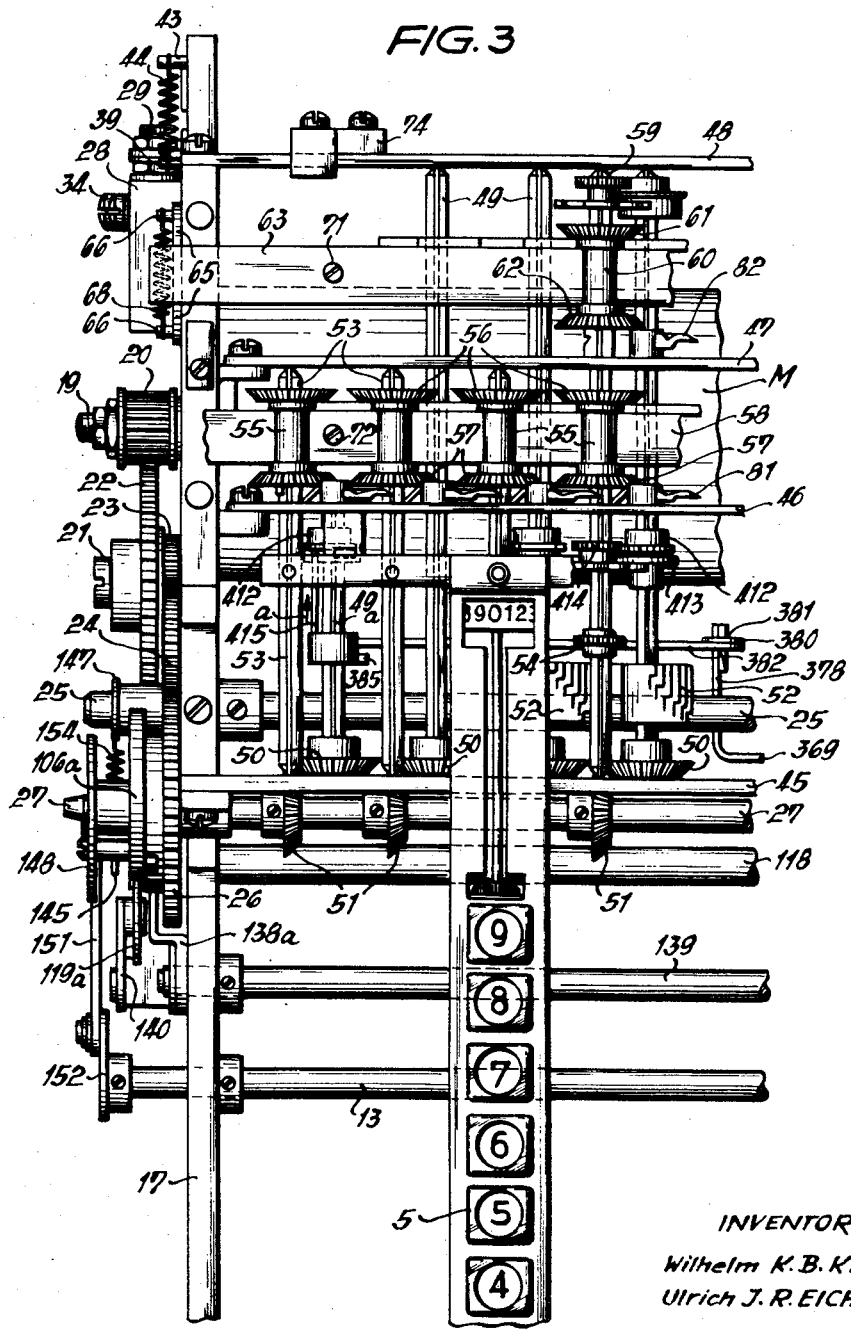
Figure 3 is a top view of the left machine side according to Figure 2 while the carriage and the casing have been omitted and only one key-bank is being shown.

Figs. 2 and 3 illustrate the drive of the calculating machine together with a part of the control rods, and furthermore show the arrangement and construction of the differential actuator and of the carriage carrying the accumulator and revolutions counter. Connected to the inside of the left frame wall 17 is an electromotor M the driving shaft 19 of which extends through the frame wall 17, and is provided on the outside of wall 17 with a pinion 20.

Freely rotatable about a shaft 21 is an intermediate transmission which consists of a gear 22 and a pinion 23, said gear 22 meshing with the pinion 20, while the pinion 23 meshes with a gear 24. The gear 24 is rigidly connected with a shaft 25 which serves as driving shaft for the carriage shifting mechanism and also for the clearing mechanism. Meshing with the gear 24 is a gear 26 of the same diameter which is freely rotatable about a shaft 27 and is adapted to be coupled with the shaft 27 by a clutch mechanism which will be described later. The shaft 27 represents the main drive shaft for the differential actuator.

The outside of the left-hand frame wall 17 is furthermore provided with switch-on contacts for the motor. Connected with the insulated base 28 are two contact pins 29 and 30 respectively connected to the current conductors 31 and 32 for the motor. Another current conductor 33 leads through a contact screw 34 likewise to the motor M. The contact pin 29 is provided with a two-arm contact lever 36, 37 rotatable about the pivot 35. The lower lever arm 36 of the contact lever is provided with a contact 38 adapted together with the corresponding fixed contact pin 30 to bring about closing of the circuit. As illustrated in Fig. 2, the contact lever 36, 37 is normally held in its switched-off position by an abutment 40 provided on the bar 39 and contacting the upper lever arm 37 of the contact lever, and is closed by the power of spring 437 when the bar 39 is moved toward the right. The bar 39 which is provided with a slot 41, is movably journalled on the machine frame by a pin 42, engaging said slot and is held in its illustrated normal position by means of a spring 44 one end of which is connected to the bar 39, while the other end of said spring is connected to a pin 43 which in its turn is connected to the frame wall.

In the rear portion of the calculating machine between the left frame wall 17 and the right frame wall 18 there is arranged the differential actuator which consists of cylinders having teeth of different length. The differential actuator is provided with bearing bars 45, 47 and 48 (Fig. 3) which are connected to and arranged between frame walls 17 and 18 and between which a number of square shafts is journalled. Between the outermost bearing bars 45 and 48 there is journalled a first group of square shafts 49. The square shaft 49a intended for the highest decade extends only between the bearing bars 45 and 46. The front ends of all square shafts 49 including shaft 49a are provided with bevel gears 50, each of which meshes with a bevel gear 51. The bevel gears 51 are rigidly connected to the main drive shaft 27. Arranged upon the square shafts 49 between the bearing bars 45 and 46 are the toothed cylinders 52, which cylinders may be called staggered cylinders. Between the bearing bars 45 and 47 there is furthermore journalled a second group of square shafts 53. Each of these shafts 53 with the exception of the two last ones on the left-hand side of the calculating machine is provided with a setting opinion 54 adapted to be adjusted in axial direction along the stagged cylinders 52. Between the bearing bars 46 and 47, the square shafts 53 are provided with so-called change sleeves 55 which carry bevel gears 56 and 57 on opposite ends thereof. These change sleeves are adapted, by means of adjusting bar 58, to be moved axially on the square shafts 53 from an intermediate position in both directions. The change sleeves 55 are adapted to rotate the counting discs of the accumulator in a positive and negative direction. Furthermore, between the bearing bars 47 and 48 there are journalled square shafts 59 which carry change sleeves 60 provided at their ends with bevel gears 61 and 62, said sleeves being adapted likewise by means of an adjusting bar 63 to be moved axially in both directions. The change sleeves 60 of which in Fig. 3 one only has been illustrated, serve for driving the counting discs of the revolutions counter in a positive as well as in a negative direction. The adjusting bars 58 and 63 for the two groups of change sleeves are held in a neutral position by levers 65 arranged on the outside of the left frame wall and rotatable about the bolts 64. The levers 65 are provided with pins 66. Furthermore, abutment pins 67 are provided on the frame wall below the adjusting bars 58 and 63. The adjusting bars 58 and 63 which somewhat protrude beyond the frame wall 17 are each engaged by two levers 65. These two levers are held against the abutment pins 67 by means of a pre-loaded spring 68 having its ends connected to the pins 66. As will be clearly evident from Fig. 2, the springs 68 maintain the adjusting bars 58 and 63 in a neutral intermediate position. Shafts 69 and 70 serve for adjusting the adjusting bars 58 and 63. These shafts 69 and 70 are mounted below the bars 58 and 63 and between the frame walls 17, 18. The shafts 69 and 70 are connected with the adjusting bars 58 and 63 near the two ends of the frame walls by means of levers 71, 72. In order to be able to adjust the adjusting bars 58 and 63 toward the front or toward the rear, it is necessary that the two shafts, 69, 70 may be turned in both directions. The devices for turning the two shafts will be described later.

Fig. 2 illustrates further details of the drives for the differential actuator and details of the accumulator and revolutions counter arranged in the carriage. The carriage 2 is connected to and guided by bar 73 journalled in bearings 74, which latter are connected to the rear bearing bar 48 adjacent the two ends of the machine. The carriage is furthermore provided with a front and with a rear row of counting discs 75 which form the indicating elements of the accumulator and counter, respectively. The counting discs 75 are arranged below the upper surface of carriage 2 in such a manner that only one number is respectively visible in each sight hole 76. The counting discs 75 are rigidly connected with a shaft 77 respectively which is journalled in the carriage and which protrudes beyond the upper side of the carriage and is adapted to be manually adjusted at random by means of a rotatable knob 77a. The counting disc shaft furthermore carries a clearing pinion 78, a decimal transfer fingers 79 and, in the accumulator, a driving bevel gear 80. The driving bevel gears 80 of the accumulator are arranged within the range of the bevel gears 56, 57 of the change sleeves in such a manner that when the change sleeves are adjusted toward the front or toward the rear, one bevel gear of the respective change sleeve will mesh with a driving bevel gear for the respective counting disc. The decimal transfer fingers 79 are furthermore located within the range of decimal transfer levers 81 and 82, respectively, which are arranged on the bearing bars 46 and 47, in such a manner that when the discs 75 change from 9 to 0 or from 0 to 9, the decimal transfer bars 81 and 82 which are pivotally mounted on the machine frame are adjusted so that during a calculation, a decimal transfer into the next higher decade can be effected.

When the decimal transfer finger 79 passes by the decimal transfer lever or forked lever 81, lever 81 displaces to the left (with regard to Fig. 6) an element 412 carrying a decimal transfer tooth 413 and being mounted on a square shaft 49a so that tooth 413 engages a gear 414 in a manner known per se when the last tooth of the stepped cylinders is being moved out of the setting pinion 54. Element 412 is displaceably mounted on shaft 49 carrying the stepped cylinders, whereas gear 414 is connected to and mounted on square shaft 53 carrying the displaceable setting pinion 54. Thus, by means of transfer tooth 413, shaft 53 is rotated further by one unit, i.e. one-tenth of a revolution beyond the position into which it was moved by pinion 54, whenever in the next lower order a decimal transfer did occur. Details of this decimal transfer are not shown in the drawings inasmuch as they are well-known and not necessary for an understanding of the present invention. The counting mechanisms of the revolutions counter are designed in an analogous manner. The corresponding bevel gears 83 are driven by corresponding change sleeves 60 or the bevel gears 61 and 62 thereof, while the square shafts 59 through decimal transfer mechanisms are likewise driven by the square shafts 49.

As has been mentioned, the calculating machine comprises a keyboard composed of individual key banks 5 into which may be entered numerical values. Such entry brings about a corresponding axial adjustment of the set wheels 54 on the square shafts 53. In this instance, generally known mechanisms are involved the illustration of which as well as their operation does not appear to be necessary for an understanding of the invention, so that a discussion of these mechanisms has been omitted. It is merely important to state that, when the main calculating shaft 27 is rotated by one revolution, depending on the position of the set wheels 54 with regard to the corresponding staggered cylinder 52, a numerical value corresponding to the entered value is transferred through change sleeves to the counting discs, and this in the positive or negative direction, depending on the position of the change sleeves relative to the drive wheel.

*Carriage shift mechanism*

Figure 4:
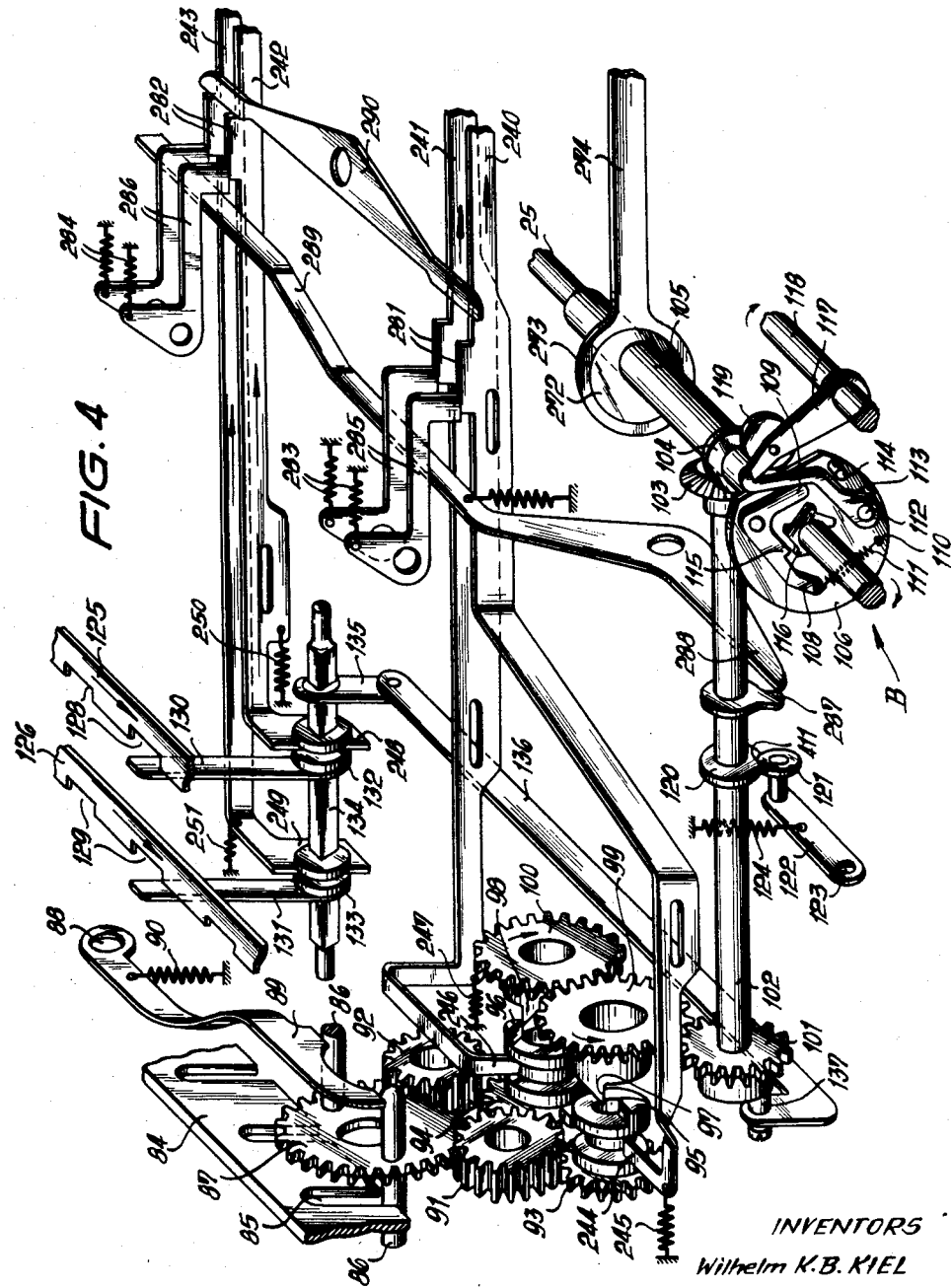
Figure 4 is a perspective diagrammatic view of the shifting mechanism for the carriage and also shows the clearing mechanism for the accumulator and revolutions counter provided in the carriage.

In order to be able to move the carriage 2 by decades with regard to the differential actuator and the setting mechanism and furthermore in order to be able in every position of the carriage to clear, i.e., to set to zero, the accumulator and revolutions counter in the carriage by means of function control keys provided in the stationary calculating machine frame, the calculating machine is provided with a driving mechanism as diagrammatically illustrated in Fig. 4. To this end, the carriage 2 is provided with a rake bar 84, the recesses 85 of which are engaged by two pins 86 which are mounted on a drive wheel 87. A lever 89 pivotally mounted on the machine frame at 88 rests upon the pins 86 and is held thereagainst by a spring 90 to centralize the drive wheel in full cycle position. Two relatively wide gears 91 and 92 mesh with the gear 87. The gear 91 meshes with a gear 93, while the gear 92 meshes with the gear 94. Each of the gears 93 and 94 is movable in axial direction on the respective rotatable shaft carrying the same, against the thrust of a spring 245 and 247, and each of these gears is provided with a clutch jaw 95 and 96, respectively. The clutch jaws 95 and 96 respectively face clutch jaws 97 and 98, respectively connected to gears 99 and 100, which gears have the same diameter and mesh with each other. The gear 99 is driven by a further gear 101 which is rigidly connected to a shaft 102. Arranged on the right-hand end of the shaft 102 (Fig. 4) is a bevel gear 103 which meshes with a bevel gear 104, the latter being rigidly connected to the sleeve 105. The sleeve 105 is rotatably mounted on the drive shaft 25. Rigidly connected to the sleeve 105 is a disc 106 which is provided with means for effecting a coupling connection with the shaft 25. To this end, there is pivotally mounted on the pivot 107 of the disc 106 a two-arm bellcrank lever 108, 109. A spring 111 connected at 110 to the disc 106 is connected to the arm 108 of said bellcrank lever. The lever arm 109 of said bellcrank lever rests against a pawl 113 pivotally mounted on the pivot 112, which pawl, due to the spring 111 connected to said bellcrank lever limits against an abutment 114 on the disc 106. In this position of the clutch members, the nose 115 on the lever arm 108 engages one of the teeth of the ratchet wheel 116, which latter is rigidly connected to the drive shaft 25. A control pawl 117 cooperates with the pawl 113, said control pawl being rigidly connected to the control shaft 118. The end of the control pawl 117 is provided with a roller 119 which is adapted to roll on the circumferential surface of the disc 106. Adjacent the end of the pawl 113, the disc 106 has a segment cut off and is provided with a recess adapted to receive the roller 119.

The operation of this transmission clutch will be evident from Fig. 4. The control pawl 117 has its end resting against the hook-shaped end of the pawl 113, as a result of which the pawl 113 is turned backward in anti-clockwise direction, loads the spring 111 through the intervention of the lever arm 109 and causes the clutch nose 115 to disengage the teeth of the ratchet wheel 116. In this position the driven part of the clutch, i.e. the disc 106 is secured against a return rotation by a ratchet mechanism which will be described later. If now the control pawl 117 is turned in clockwise direction, the pawl 113 is able to swing outwardly and due to the thrust of the spring 111 is adapted to engage the abutment 114. The nose 115 on the lever arm 108 moves into the range of movement of the ratchet wheel 116 so that the driven part of the clutch is rotated. It will furthermore be clear that due to the roller 119, the control pawl 117 will, during revolution of the disc 106, be held in its release position. After a clockwise revolution has been completed, the pawl 117 will move into the path of the hook-shaped end of the pawl 113 so that the clutch is released. It will be evident from the drawing that with a release motion of the control pawl 117 of only a short duration, the driven part of the clutch will carry out a complete rotation which latter is transferred by bevel gears 104 and 103 to the shaft 102 and thus to the two gears 99 and 100.

In order to eliminate the gear play and to safeguard the shaft 102 against backwards rotation, the shaft 102 is provided with a disc 120 which has a notch adapted to be engaged by a roller 121. The roller 121 is rotatably mounted on a lever 122 which is pivotable about a pin 123 and by means of a spring 124 is pressed in a direction against the disc 120. It will be obvious that in view of this engaging mechanism, the shaft 102 after each carriage indexing step will occupy exactly the same position, so that also the clutch halves 97 and 98 will likewise always occupy the same position. As will furthermore be clear from the drawing, by making the clutch parts 95 and 96 effective and causing the drive shafts 25 and 102 and thereby the gears 93, 91, 87 or 94, 92, 87, respectively to perform one revolution, it will be possible through the intervention of the pins 86 and the rake bar 84 to move the carriage toward the left or toward the right.

*Clearing mechanism*

As mentioned above, the shafts pertaining to the number discs of the accumulator and revolutions counter comprise clearing pinions 78 (Fig. 2) which serve to bring the number discs into a position in which all of them will show a zero in the sight holes 76. To operate the pinions, clearing bars 125 and 126 (Fig. 4) parallel to the clearing pinions are movably arranged in the carriage. These clearing bars 125 and 126 are adapted in a manner known per se and, therefore, not illustrated in the drawing, to set the number discs to zero. The clearing bars 125, 126 have their right ends provided with recesses 128 and 129 which correspond to the individual denominational positions of the carriage. Clearing levers 130 and 131 adapted to cooperate with recesses 128, 129 are mounted on a square shaft 134 by means of hubs 132, 133 adjustable axially thereon. The square shaft 134 is connected with a lever 135 which is pivotally connected to a link bar 136 which, at its distal end, is pivotally mounted on the pivot 137 that is eccentrically connected to the gear 101. From Fig. 4 it will be seen that, when moving the clearing levers 130 and 131 toward the right, the ends of the clearing levers engage the recesses 128 and 129, respectively, and that, when the shaft 102 is rotated, the clearing bars 125, 126 move in the direction of the arrows and thus are able to clear the counting mechanisms.

*Calculating drive*

There will now be described in detail the control mechanism for making the drive for the differential actuator effective and ineffective and there will also be described the changeover mechanism for the change sleeves. The gear 26 (Fig. 2), which is freely rotatable about the main calculating shaft 27, is provided in a manner similar to that of the drive shaft 25 with a ratchet wheel 116a by means of which the gear 26 may be coupled to the main calculating shaft 27. This clutch, designated by the letter A is designed in exactly the same manner as has been described in Fig. 4 in connection with the clutch of the shifting and clearing mechanism. In order to make the clutch effective, there is provided a pawl 138a which is connected to a control shaft 139 extending through the calculating machine from left to right. Connected to the control shaft 139 is furthermore a lever arm 140 whose end is provided with a roller 119a. The roller 119a corresponds to the roller 119 of the other clutch B.

Connected to the main calculating shaft 27 is a disc 106a which has the same task as the disc 106 of the clutch shown in Fig. 4. The disc 106a has the same control elements as the disc 106 of the clutch B. Connected to the control lever 138a is a pin 141 which engages a slot 142 in the control bar 39. As will be seen from Fig. 2, a lever 143 is rigidly connected to the end of the control shaft 118. When pivoting in clockwise direction, the lever 143 engages the abutment 144 on the control bar 39 to shift the bar toward the right. Furthermore, a lever 145 is rotatably mounted on that end of the shaft 118 which protrudes beyond the machine frame. After each complete revolution, the lever 145 engages the stud 107a provided on the disc 106a. The purpose of the lever 145 consists in maintaining the main calculating shaft 27 in Fig. 2 position after the clutch has been made ineffective, and thus to prevent the main calculating shaft 27 from rotating backwards. The lever 145 is positioned by means of a spring 146, one end of which is connected to the lever 145 while the other end of said spring engages an eye provided in a ring 147 mounted on the shaft 25. It will be seen from Fig. 2 that, when turning the control shaft 139 in clockwise direction, the transmission clutch A for coupling the main calculating shaft 27 to the motor, engages in the same manner as described in connection with the transmission clutch B for the carriage shift. Simultaneously, through the intervention of the pin 141, the bar 39 is moved toward the right so that due to the thrust of the spring 437, current contact between 30 and 38 is established for the motor M. During a revolution of the main calculating shaft 27, the roller 119a rolling on the disc 106a keeps the lever 140 in its clockwise rocked position so that the motor remains switched on up to the end of a calculating revolution. A similar motor energizing function is also served by the lever 143 connected to the control shaft 118. This lever, through the intervention of the abutment 144 and while the transmission clutch B is effective, keeps the bar 39 in its rightward position, so that the motor contact likewise remains closed.

In order to complete the description of the parts shown in Fig. 2, there will be described a mechanism the purpose of which will be explained later in connection with the entire control mechanism. Rigidly connected to the main calculating shaft 27 is a cam plate 148 which is located within the range of movement of a roller 150 which latter is rotatably mounted on the end of the lever 149. The lever 149 is likewise loosely mounted on the protruding shaft 118 and is connected through a link 151 with the end of a lever 152 which is rigidly connected to a shaft 153 that likewise extends through the calculating machine from left to right. A spring 154 having one end connected to the lever 149 and having its other end in engagement with the ring 147 holds the two levers 149 and 152 counterclockwise with lever 152 limiting against the abutment 155. The shaft 153 is the resetting shaft for "calculating." Its meaning will be explained later in connection with the description of the control mechanism for the machine.

Change sleeve adjustment

Figure 5:
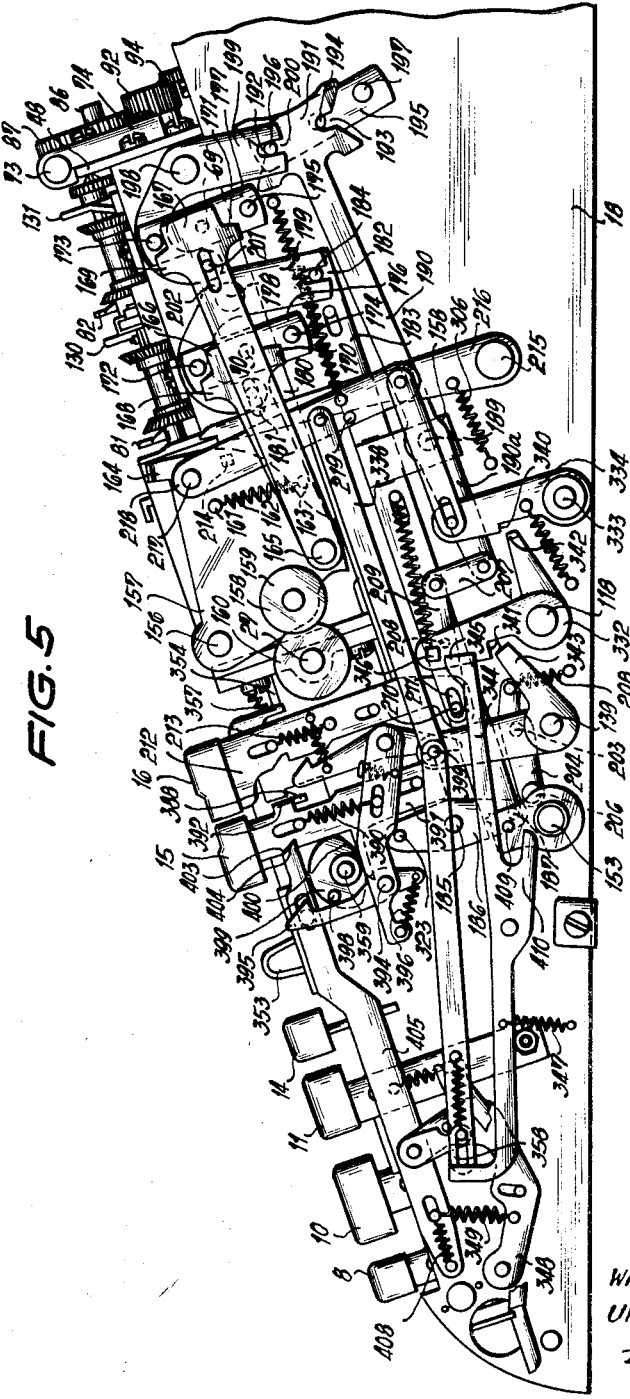
Figure 5 is a total view of the right frame wall seen from the outside.

To shift the change sleeves into engagement with the drive wheels of the counting discs, there is provided a mechanism as shown particularly in Fig. 5. Pivotally mounted on the pivot 156 on the outside of the right-hand frame wall 18 is a plate 157 which is provided with a roller 159 rotatable about the pivot 158. In the rest position of the differential actuator, the roller 159 engages a recess of the disc 160 which latter is rigidly connected to the main calculating shaft 27. The plate 157 is furthermore provided with a pin 161. One end of a spring 162 engages the pin 161 while the other end of the spring 162 is connected to the pin 163 on the frame wall 18. As a result thereof, the roller 159 on plate 157 is kept in engagement with the disc 160 on the main calculating shaft 27. The upper end of the plate 157 is provided with a locking tooth 164 which, when calculating, engages corresponding notches of the carriage and prevents a movement of the carriage. Adjacent the lower left end of the plate 157 there is connected thereto a pivot 165 upon which two control push-rods 166 and 167 are pivotally mounted. These control push-rods 166 and 167 are adapted to have their upper cheeks 168, 169 and lower cheeks 170, 171 respectively abut the studs 172, 173, 174, and 175. Of these studs, the studs 172 and 174 are connected to a two-arm lever 176, which is rigidly connected to the shaft 70 shown in Fig. 2. The studs 173 and 175 are connected to a similar two-arm lever 177 which is rigidly connected to changeover shaft 69 extending through the calculating machine. It will be seen from Fig. 5, that, when rotating the main calculating shaft 27, the plate 157 will through the intervention of the disc 160 be turned about the pivot 156 in counter-clockwise direction. As a result thereof, the two control push-rods 166 and 167 will, depending on their control position, into which they have been moved in clockwise or counter-clockwise direction, turn the shafts 69 and 70 in clockwise or counter-clockwise direction, and will thus connect the change sleeves with the drive shafts in an additive or subtractive sense.

In order to adjust the two control push-rods 166 and 167, there are provided the following mechanisms: Pivotally mounted on the pivot 178 which is connected to the frame wall 18, is a two-arm lever 179 the upper curve lever arm of which carries a pin 180. This pin engages a slot 181 in the control push-rod 166 and is adapted to adjust the control push-rod 166 in a direction transverse to its longitudinal axis. The lower lever arm of the lever 179 is provided with a recess 182 so as to straddle a bolt 184 connected to the control bar 183. The control bar 183 is by means of slot-shaped guiding openings movably mounted on the frame wall and is operatively connected through the intervention of the bolt 187 with the lower lever arm of a lever 186 pivotally mounted at 185. The control bar 183 is furthermore provided with a tongue 188 extending downwardly. Mounted on said tongue is a pivot 189 pivotally supporting a changeover lever 190. The lever 190 is provided with a hammer-shaped head 191 the upper and lower sides of which have notches 192, 193 which widen toward the outside in the manner of a cone. Pivotally mounted on a stud 194 connected to the machine frame is a two-arm lever 195. The two lever arms of this lever 195 are each provided with a stud 196 and 197, respectively. At 198 on the machine frame there is pivotally mounted a two-arm lever 199 having a slot 200 straddling the stud 196. The upper curved lever arm of the lever 199 is provided with a pin 201 which extends through the slot 202 in the control push-rod 167. It will be seen from the drawing that by tilting the lever 186 in clockwise direction, the levers 179 and 199 are likewise tilted in clockwise direction. As a result thereof, the control push-rods 166 and 167 occupy their upper tilted positions in which they adjust the two shafts 69 and 70 in clockwise direction, thereby being adapted to couple the accumulator and the revolutions counter in positive direction with the differential actuator and counter actuator, respectively. When moving the lever 186 in counter-clockwise direction, it will thus be clear that the two control push-rods 166 and 167 are tilted downwardly as a result of which when the differential actuator is operative, the shafts 69 and 70 are turned in counter-clockwise direction and the change sleeves are made effective for a subtractive calculation. In order to maintain the lever 186 and thus the control rod system pertaining thereto in one or the other end position, a two-arm lever 204 is journalled at 203 on the machine frame. This lever 204, due to the thrust of the spring 205, rests with a bolt 206 against the two flanks at the lower end of the lever 186, In order to be able to control the control push-rod 167 relative to the control push-rod 166, so that the accumulator and the revolutions counter operate with different signs, the following mechanism is provided. The reversing lever 190 is provided with a rearward extension 190a the end of which is connected to a link 207 which in its turn is operatively connected with a two-arm lever 209 mounted at 208 on the control bar 183. The other lever arm of the lever 209 has a stud 210 which engages a slot 211 provided in a slide 212 which latter is mounted on the frame wall and movable in a direction transverse to said slot. The slide 212 is held in its upper adjusted position by a spring 213 and carries the key 16. It will be clear from the drawing that, when depressing the key 16, the changeover lever 190, 190a will be turned in clockwise direction. As a result thereof, the lever 190, 190a moves the notch or recess 193 over the stud 197 on the lever 195 and brings about a clockwise tilting movement of the lever 195. The stud 196 of the lever 195 now released from the notch 192 and simultaneously straddled by the notch 209 of the lever 199 adjusts the lever 199 in counter-clockwise direction and presses the control push-rod 167 into its lower tilted position.

It will be seen from the drawing, that when reversing the lever 186, the control push-rods 166 and 167 will be adjusted in opposite direction, thereby making it possible to cause the accumulator to operate in an additive sense and the revolutions counter to operate in a subtractive sense, and vice versa.

The operation of the changeover mechanism for the change sleeves will be evident from Fig. 5. When the main calculating shaft 27 revolves, the roller 158 is forced out of the notch of the disc 160 and tilts the plate 157 in counter-clockwise direction against the thrust of the spring 162. Depending on their set positions, the two control push-rods 166 and 167 move the change sleeves in one or the other direction, so that numerical values from the setting mechanism can be transferred into the accumulator and the revolutions counter operated by its actuator. During this operation, the locking tooth 164 locks the carriage against lateral movement.

When multiplying and dividing, the main calculating shaft 27 carries out a plurality of rotations. During such operations, the plate 157 would cyclically return to its starting position if the roller 159 would engage the notch of the disc 160. In order to avoid the shocks which would be caused thereby, the following mechanism has been provided: The plate 157 is provided with a pin 214 of square cross-section which is adapted to be engaged by the upper end of a pawl 216 pivotally mounted in the machine frame 18 at 215. A lever 218 is pivotally connected to a pivot 217 on the plate 157. This lever 218 carries a stud 219 by means of which the pawl 216 is held in ineffective position. As will be explained later, when a function control key is depressed for calculating, the lever 218 is moved leftwardly (with regard to Fig. 5) i.e., in clockwise direction, so that the pawl 216, is released and urged by the spring 306 abuts the square pin 214, so that, when the plate 157 is rocked, it is locked by the pawl 216 until the lever 218 has again returned to its starting position.

The principle of the operation of the calculating machine will be clear from the preceding description. In order, for instance, to be able to carry out a calculating operation, it is necessary, depending on whether a plus or minus calculation is involved, to rock the lever 186 on the right-hand frame wall in order to enable the push rods 166, 167 for adjustment of the change sleeves in the desired direction upon rotation of main shaft 27. Furthermore, it is necessary to make effective the transmission clutch A at the left frame wall and the motor contact. In order to move the carriage toward the right or toward the left, it is furthermore necessary to make one of the two clutches 95, 97 or 96, 98 (Fig. 4) effective, subsequently to releasing the corresponding transmission clutch B and again to make the motor contact (Fig. 2) effective. Furthermore, for the performance of a clearing operation, it is necessary to adjust the clearing levers 130, 131, to release the corresponding transmission clutch B and also to make the motor M effective. It is obvious that the carrying out of these control movements requires a certain effort which according to the present invention is effected by power actuation, particularly by one or a plurality of power storage means which will become effective by actuation of the function control keys.

CONTOL MECHANISM
Power control center

Figure 6:
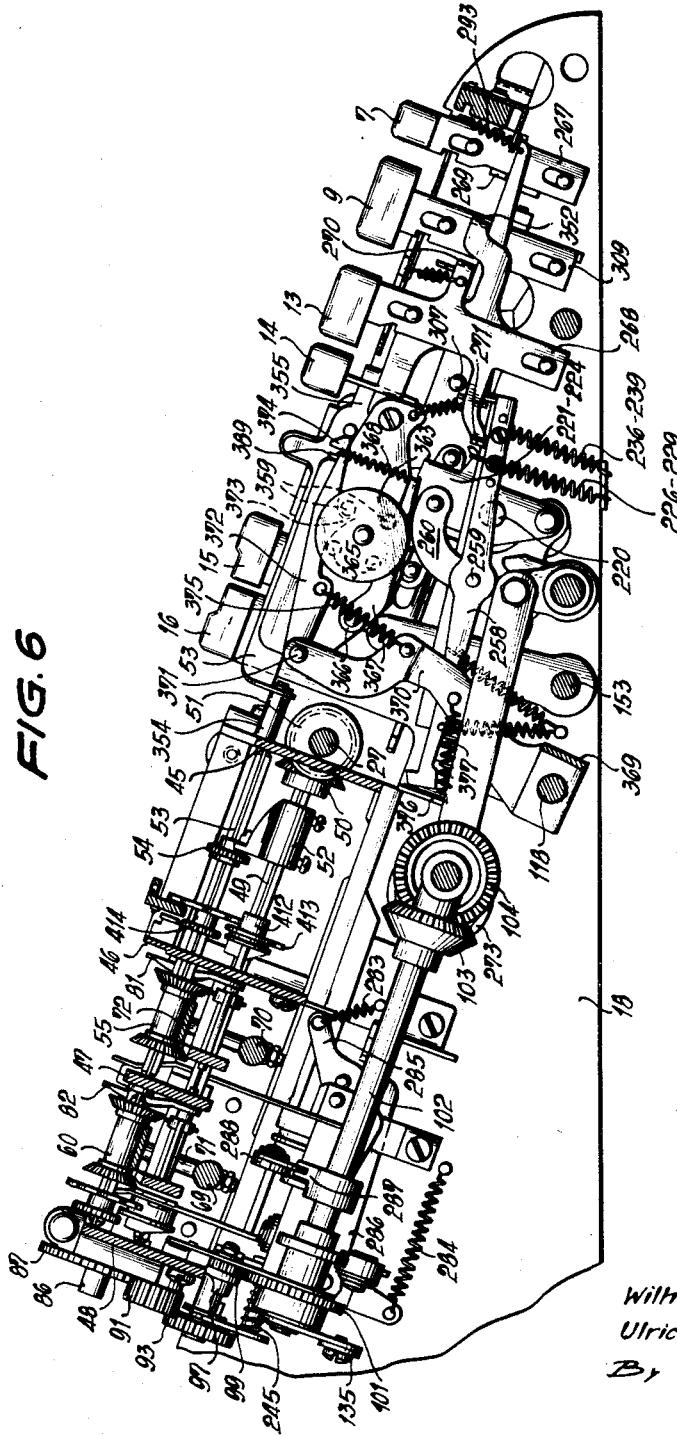
Figure 6 is a view of the right frame wall seen from the inside of the calculating machine.

As will be seen particularly from Figs. 7, 8, 9 and 10, there is provided on the outside of the right frame wall 18 a strong bearing bolt 220 having pivotally mounted thereon four plate-shaped levers 221 to 224 which are adapted to carry out the control action and which are separated from each other by ring-shaped spacer members 225 (Fig. 10). Each of these actuating levers 221 to 224 is provided with an eye or a hook engaged by a strong tension spring 226 to 229, respectively. The other ends of these tension springs are connected to a metal sheet 230 which is riveted to the right frame wall 18. Somewhat further toward the front and above the bolt 220 there is a second bolt 307 connected with the inside of the frame wall 18. Pivotally mounted on the bolt 307 are four additional levers 231 to 234 which form the function command elements proper, and which are likewise separated by ring-shaped spacer members 235 (Fig. 10). As is shown in Figs. 6 and 7, but not in Fig. 8 there is connected to each of these command levers 231 to 234 one end of a tension spring 236 to 239, respectively, the other end of which is likewise connected to the metal sheet 230. The command levers 231 to 234 are provided with latching notches against which one edge of the power control members or plate-shaped actuating levers 221 to 224 may rest. The four springs 226 to 229 are strongly pre-loaded in the position of the plate-shaped lever 221, shown in Fig. 9. If, now, a command lever 231 to 234 respectively associated with each of the levers 221 to 224 is rocked in clockwise direction by a small amount, the corresponding plate-shaped lever 221 to 224 carries out a tilting movement in clockwise direction due to the effect of the strong tension springs 226 to 229 connected thereto. The actuated command lever 231 to 234 is held in its respective tilted position against the tension springs 236 to 239 connected thereto by engagement with the actuating lever 221 to 224 released by said command lever. If, now, by means of a resetting mechanism, which will be described later, the plate-shaped levers 221 to 224 are shifted in anti-clockwise direction while the springs 226 to 229 connected thereto are loaded, the upper edges of the actuating levers 221 to 224 again engage the above mentioned latching notches of the command levers 231 to 234. The levers 221 and 231 and the levers 222 and 232, etc. therefore interlock each other.

Fig. 9 of the drawing furthermore illustrates the following properties of the here successively arranged control elements which consist of a lever 221, a spring 226 associated therewith, a command lever 231 and a spring 236 associated therewith. The tension spring 226 actuates the power control lever 221 by means of a relatively small lever arm. The latching notch for holding the power actuating lever 221 by the command lever 231 associated therewith is spaced from the shaft of rotation 220 by approximately twice the length of said small lever arm. Consequently, only half the power of the spring 226 acts upon the latching notch. Furthermore, the latching notch is located with regard to the shaft of rotation 307 so that the torque exerted by the power control lever 221 upon the corresponding command lever 231 is zero. Furthermore, the distance between this latching notch and the shaft 307 of the command lever 231 is relatively small in comparison to the distance of the point of attack of the keystems with regard to the shaft 307. The effective lever arm of the command lever 231 to 234 for the springs 236 to 239 is also relatively small. In view of these adopted measures, there will in the locked position of the power actuating levers 221 to 224 exist only a relatively small friction force between the upper edges of the power actuating levers 221 to 224 and the corresponding latching notches of the command levers 231 to 234. This friction force is to be overcome over a short distance in order to release the power actuating levers 221 to 224 and to make the same effective. From this arrangement it will be evident that the control commands can be entered into the machine through the keys 7 to 10 and 12 to 14 by a very low key pressure.

*Carriage transport and clearing mechanism for the accumulator and revolutions counter*

As will be seen from Figs. 4 and 8, the power actuating member 221 is adapted selectively to make effective the control trains 240 and 242. The control train 240 serves to render effective the left shift train, while the control train 242 serves for making effective the clearing lever which clears the accumulator. The power control member 222 is in an analogous manner used for selectively actuating the control train 241 for the rightward carriage shift and for selectively actuating the control train 243 for setting and making effective the clearing lever for the revolutions counter. As will be seen from Fig. 4, the train 240 has its hook-shaped end 244 in a cutout portion of the clutch jaw 95 which latter is thus held in its ineffective position by means of a spring 245 which is connected to the hook-shaped end 244 of the control train 240. Furthermore, the hook-shaped end 246 of the control train 241 engages a cutout portion of the clutch jaw 96 as a result of which the latter is likewise held in its ineffective position by the tension spring 247. In an analogous manner, the curved ends 248 and 249 of the control trains 242 and 243 engage cutout portions of the hubs 132 and 133 which carry the clearing levers 130 and 131. The ineffective position is also in this instance brought about by tension springs 250 and 251. The other ends of the mentioned control trains 240 to 243 are likewise curved in the form of a hook (Fig. 8) in such a manner that the hook-shaped end 252 of the control train 240 faces the hook-shaped end 253 of the control train 242. In a similar manner, the other end of the control train 241 is provided with a hook 254 which is faced by a correspondingly curved end 255 on the control train 243. Between the two hook-shaped ends 252 and 253, there is movably arranged a T-shaped head 256 of a two-arm reversing lever 257, 258 which lever is pivotally connected at 259 to a link 260. The link 260 has its right end pivotally connected at 261 to the plate-shaped lever 221 and engages a pin 263 by means of a slot 262 at the left end of said link 260. The pin 263 is connected to one end of the lever 264. The lever 264 is rigidly connected to the mentioned control shaft 118 for engaging the transmission clutch B for carriage shifting and clearing. The changeover lever 257, 258 is held against a tongue 266 by means of a spring 265 connected to the link 260. As a result thereof, the T-shaped head 256 rests behind the hook-shaped end 252 of the control train 240. The calculating machine has furthermore arranged therein key stems 267 and 268 which are vertically movable. The key stem 267 is adapted through the intervention of a pin or an extension 269 to act upon the right arm of the command lever 231, while the key stem 268 is adapted through the intervention of the tongue 270 also to act upon the right arm of the command lever 231. Furthermore provided on the key stem 268 is a second tongue 271 which lies directly above the right lever arm 258 of the changeover lever 257, 258. The key stem 268 is held in its abutting position in upward direction in a manner known per se by a tension spring, not shown.

Figure 13:
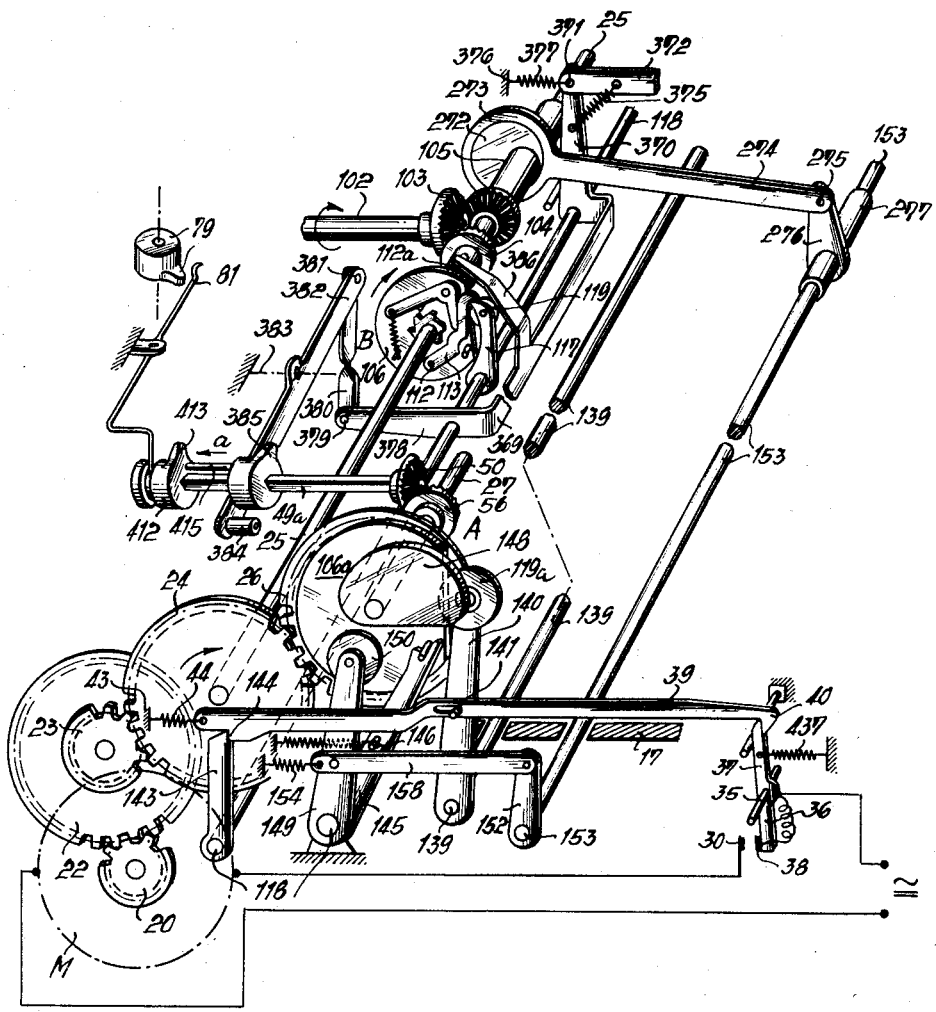
Figure 13 is a perspective diagrammatic and expanded view of the drive for the calculating machine.

In this position, the tongue 271 is located with only small play above the end of the lever arm 258, while the tongue 270 is located with greater play above the right lever arm of the lever 231. The key stem 268 carries the key 13 for clearing the accumulator. Similarly, the key stem 267 carries the key 7 for the leftward carriage shift. According to the embodiment diagrammatically shown in Fig. 8, separate tongues 270 and 271 act upon the levers 231 and 258. These tongues may according to an arrangement as shown in Figs. 9 and 10, be combined into one structural element whereby the different play is brought about by the different levels in which the two ends of the levers are located. It will be seen from Figure 8 that, when depressing the leftward shift key 7 for a short time, the command lever 231 will be tilted about the shaft 307 against the thrust of the spring 236 so that the power actuating lever 221 is released. As a result thereof, the power actuating lever 221, due to the effect of the strong spring 226, carries out a tilting movement in clockwise direction. Due to this tilting movement, the control train 240 is carried along through the intervention of the change-over lever 257, 258 and the coupling between the parts 256 and 252, so that the jaw clutch 95, 97 is made effective. Simultaneously, through the intervention of the link 260, the control shaft 118 is turned in clockwise direction, and the transmission clutch B is made effective. Furthermore, through the intervention of the lever 143 (Figs. 2 and 13) connected to the control shaft 118 and acting on abutment 144, the control bar 39 is moved toward the right so that the contact lever 36 closes the contact 30, 38 and switches on the motor M. The carriage now carries out an indexing step towards the left.

In order to return the power actuating member 221 to its starting position in which it interlocks with the command lever 231, the following arrangement is provided: Arranged on the sleeve 105 (Fig. 4) mounted on the drive shaft 25, is an eccentric disc 272, the ring 273 of which is pivotally connected by an arm 274 at 275 (Figure 8) with the end of the lever 276. The lever 276 is rigidly connected to a sleeve 277 which is rotatably mounted on the resetting shaft 153 mentioned in connection with Figure 2. Furthermore, connected with the sleeve 277 are resetting pawls 278 (only the front pawl 278 is shown in Figure 8). The front pawl 278 abuts against a pin 279 arranged at the lower end of the lever 221. When the output side of the clutch B stands still, the eccentric disc 272 and thus the lever 276 and the pawl 278 occupy the uttermost tilted-back position so that the plate-shaped lever 221 is not impeded in its movement. If the output shaft of the clutch B now performs a rotation, the two resetting pawls 278 are rotated by one revolution in clockwise direction so that the front power control lever 221 is moved backwards to such an extent that it interlocks with the command lever 231 which latter is under the influence of the spring 236.

If now, instead of the leftward shift key 7, the key 13 for clearing the accumulator is actuated, the following operation will be carried out: As mentioned above, the end of the lever arm 258 is arranged with small play below the tongue 271, whereas the right lever arm of the lever 231 is located with greater play below the tongue 270. By actuating the key 13, therefore, first the changeover lever 257, 258 is adjusted in clockwise direction as a result of which the coupling engagement between the T-shaped head 256 and the hook-shaped end 252 is released and a coupling engagement between the head 256 and the hook-shaped end 253 is made effective. In the further course of the downward movement of the key 13, the tongue 270 contacts the right arm of the lever 231 releasing power control lever 221 whereby control shaft 118 is rotated clockwise to engage clutch B and close the motor contacts. It will be obvious that now instead of a leftward shifting movement, a clearing of the accumulator is effected by operation of control train 242. After this clearing operation has been completed, and after the key 13 has been released, the changeover lever 257, 258 may again return to its starting position in which its head 256 again rests behind the hook 252. Due to the rotation of the eccentric 272, 273, the power control lever 221 is again reset, so that the same may again interlock with the command lever 231.

The reversing mechanism described above which makes it possible by one and the same power control element 221 to bring about the leftward carriage shift when actuating the function control key 7 and to bring about a clearing of the accumulator when actuating the other function control key 13, is duplicated in an analogous manner for the two functions right carriage shift and the clearing of the revolutions counter. To this end, the stem 291 of the key 8 for the rightward carriage shift is provided with a pin 292 which acts upon the right lever arm of the command lever 232. A spring 293a is provided between the key stem 291 and the end of the right lever arm 232. Furthermore, there is connected to the upper end of the power control member 222 at 294 a link 295 which likewise through the intervention of a slot 296 straddles the pin 263 on the lever 264. Also here on the link 295 there is journalled at 297 a changeover lever 298, 299 which is held against the tongue 301 by a spring 300. Also in this instance, the changeover lever 298, 299 carries a T-shaped head 302 which, due to the thrust of a spring 300, engages the hook-shaped end 254 of the control train 241.

The function control key 12 for clearing the revolutions counter is arranged at the upper end of a key stem 303 which is held in its normal undepressed position by a spring not shown in the drawing. The key stem 303 is provided with an angled tongue 304 by means of which it is adapted to act upon the right lever arm of the command lever 232. Furthermore, the key stem 303 is provided with an angled tongue 305 the lower surface of which is located with small play above the end of the lever arm 299. It will be seen from Figure 8 that, when actuating the rightward carriage shift key 8, the power control element 222 will be released through the intervention of the pin 292 and the command lever 232. As a result thereof, the control train 241 is actuated by the two arm lever 299, 298 acting as pulling element, through the intervention of the T-shaped head 302 and upturned extension 254. As will be seen from Figure 4, the control train 241 closes the clutch between the clutch halves 96 and 98 so that the drive for the rightward carriage shift is set. In view of the rightward movement of the link 295, the control shaft 118 will be turned in clockwise direction through the intervention of the pin 263 and the lever 264 so that the transmission clutch B and the motor contact are again made effective. Consequently, the rightward carriage shift is now effective.

The initiation of the revolutions counter clearing function is effected in analogous manner to that described in connection with the key 13 for clearing the accumulator. When depressing the function control key 12, first the shift-over lever 298, 299 is turned through the intervention of the bent tongue 305 so that the T-shaped head 302 now engages the hook-shaped end 255. During the further course of the downward movement of the key stem 303, the bent tongue 304 engages the right arm of the locking lever 232 so that the power control element 222 is released. Thus, also in this instance, the control shaft 118 is rotated in clockwise direction through the intervention of the link 295, the pin 263, and the lever 264, as a result of which the transmission clutch B and the motor contact are made effective. Operation of control train 243 by power control member 222 (Fig. 8) moves clearing lever 131 (Fig. 4) into one of the recesses 129 of clearing bar 126, the bent end 249 of control train 243 being embraced by grooved hub 133 on the clearing lever. As a result thereof, the clearing bar 126 is moved in the direction of the arrow during the rotation of the shaft 102 through the intervention of the parts 134 to 137. Consequently the revolutions counter is set to "zero."

In order that the control rods 240, 241 for preparing a carriage shift and the control bars 242, 243 for clearing of the accumulator and revolutions counter will retain their set positions during a complete operating cycle, the calculating machine is furthermore provided with the following arrangements shown in Figure 4. The control trains 240, 241 and the control trains 242, 243 are provided with lugs 281 and 282 respectively, against which pawls 285 and 286 respectively are adapted to abut due to the thrust of the springs 283, 284. If now one of the four mentioned control trains is moved in the direction of the respective arrow, the corresponding pawl will drop behind the lug 281 or 282 respectively associated with the respective pawl so that the return movement of the control train will be blocked. The drive shaft 102 is provided with a control cam 287 which shortly before the end of the rotational movement of the shaft 102 contacts the arm 288 of a lever the second arm 289 of which is located below the pawls 285, 286. Therefore, only shortly before the end of the respective operating cycle the respectively effective control train will be released to return to its starting position. A further safeguard against simultaneous actuation of a control train for carriage shift and of a control train for clearing is obtained by a two arm lever 290 tiltably mounted in the machine, one end of said lever resting against the free side of the lugs 281 and 282. It will be seen from Figure 4 that, when a carriage shift control train is thrown in, the throwing in of a clearing control train is blocked by the lever 290, and vice versa. The above described interlock serves to prevent simultaneous operation of a carriage shifting control train and a clearing control train. To prevent simultaneous operation of the left and right shift control trains, a locking heart 308 is provided between the key stems 267 and 291, which locking heart may be fixedly connected to shaft 308a. The shaft 308a is provided with an extension (not shown in the drawing) which extends in the direction toward the key stems 268 and 303. Rigidly connected to shaft 308a is a further locking heart (not shown in the drawing) which is arranged between the key stems 268 and 303. In this way, the keys 7, 8, 12, and 13 can release only one of the command levers 231 and 232 at a time. Arranged between the key stem 267 and the command lever 231 is a spring 293 which keeps the command lever 231 in engagement with the pin 269. A similar spring 293a is provided between the key stem 291 and the command lever 232, thereby making it possible to actuate the two command levers 231 or 232, for instance during automatic operations by the machine, even when the function control keys 7, 8 or 12, 13 are locked. The springs 311 and 314 (Fig. 7), for the plus and minus keys 9 and 10 serve the same purpose. The key stems of the keys 7, 8, 9 and 10 are not locked in their depressed position. It is, however, necessary that these keys stay in their depressed position because only in said position will locking of the other function control keys be effected by the locking hearts 308. Inasmuch as the function levers associated with each function control key occupy a certain position when said levers are in their tilted positions, it is the purpose of the springs 293, 293a, 311 and 314 to hold the abutment pins (for instance 269) of the key stems (for instance 267) in abutment with the respective function lever (for instance 231) to thereby hold the key likewise in a certain position. A positive connection between the key stems and the function levers pertaining thereto is not possible because the function levers must also be tiltable when the key stems are locked as is the case during the automatic division.

*Plus and minus calculation*

The power control center provided in the calculating machine furthermore comprises two power control elements provided for the setting of a calculating operation. A separate power control element (Fig. 7) is respectively adapted to control plus and minus operation, respectively. The function control key for minus calculation is arranged at the upper end of a key stem 309 which is vertically movable in the machine. This key stem 309 is adapted through a tongue or pin 310 to act upon the command lever 233. One end of a spring 311 is connected to the command lever 233 while the other end of said spring is connected to a pin on the key stem 309. This spring holds the lever 233 in contact with the pin 310. The key 10 for plus calculation is connected in an analogous manner with the key stem 312 which acts upon the command lever 234 through a pin 313. Also in this instance a spring 314 has one of its ends connected to the lever 234 while its other end is connected with key stem 312. As between the two key stems of the transport keys; also between the key stems 309 and 312 there is provided a locking heart 315 which prevents simultaneous depression of the two function control keys. Associated with the two command levers 233 and 234 are plate-shaped levers 223 and 224 which are under the influence of the springs 228, 229 and are held in locked position by the command levers 233 and 234. The return positions of the levers 233 and 234 and thus the positions of the function control keys 9 and 10 are brought about by the springs 238, 239 respectively. Links 316 and 317 are pivotally connected with the upper ends of the levers 223 and 224 which links by means of slots 318 and 319 straddle a pin 320 which is connected to the upper end of a lever 321. The lever 321 is non-rotationally mounted on the control shaft 139 Fig. 2. The extension of the link 316 is provided with a slot 322 engaged by a bolt 323. The bolt 323 is provided at the upper end of lever 186 which is located on the other side of the right frame wall 18. The bolt 323 thus extends through an opening in the right frame wall 18. The control bar 183 is by means of a pivot 187 pivotally connected to the lower end of the two arm lever 186. The last mentioned parts are located on the outside of the right frame wall 18 as has been shown in Figure 5.

Connected with the lower end of the lever 224 is a control slide or push rod 324 adapted likewise to act upon the bolt 323. Figure 7 illustrates the manner of operation of the control mechanism provided for the setting of a calculating function. When, for instance, the minus key 9 is depressed, the command lever 233 is tilted in clockwise direction so that the lever 223 due to the thrust of the spring 228 is likewise tilted in clockwise direction. Consequently, through the intervention of the slot 322, the lever 186 is likewise turned in clockwise direction with regard to Figure 7, which when viewing from the other side in Figure 5 corresponds to a turning movement of the lever 186 in counter-clockwise direction. Consequently, the control push rods 166 and 167 are moved into their lower turned position so that during the subsequent calculating motion, the change sleeves are coupled in a subtractive sense with the driving wheels of the counting discs. The throwing in of the transmission clutch A and the motor M is effected by carrying along the lever 321 and by turning the control shaft 139 in clockwise direction with regard to Figure 7.

The return movement or resetting of the power control member 223 is effected by a resetting mechanism, details of which have already been described in connection with Figure 2. To this end, the left end of the main calculating shaft 27 has been provided with a cam plate 148 adapted to co-operate with the roller 150 of the lever 149 so that, when the main calculating shaft rotates by one revolution, the lever 149 and the lever 152 connected to the lever 149 by means of the link 151 carry out a tilting movement in clockwise direction. The lever 152 is non-rotatably connected to the shaft 153 which extends through the calculating machine from right to left. This shaft 153 is provided with resetting pawls 325 (one pawl has been omitted in Figure 7 for the sake of clarity). These pawls 325 are adapted, in a manner similar to that described in connection with the power control trains for register clearing and carriage shift, to reset the levers 223 and 224 through the intervention of pins 326 connected to the lower ends thereof. In view of this resetting motion, the springs 228 and 229 are re-loaded and the command levers 233 and 234 respectively associated therewith interlock with the respective actuating levers.

If the plus key 10 is depressed, the control shaft 139 will be turned in analogous manner through the intervention of a link 317. As a result thereof, the transmission clutch A and the motor M are thrown in. However, prior thereto, the control bar system for the adjustment of the change sleeves has to be reversed and this is brought about by a bar or control push rod 324 connected to the lower end of the actuating lever 224. The lever 186 is now turned in counter-clockwise direction with regard to Figure 7 so that the bolt 323 moves to the other end of the slot 322 provided in the link 316. This plus position is illustrated in Figure 7. The resetting of the actuating lever 224 and consequent tensioning of the corresponding spring 229 is effected in exactly the same manner as has been described, at the end of the rotational movement of the main calculating shaft 27.

In order to prevent the keys 9 and 10 from being actuated simultaneously which would block the machine, there is, as between the two key stems for leftward and rightward carriage shift, a locking heart 315 provided between the key stems 309 and 312. By means of the springs 311 and 314 between the key stems and the corresponding command levers, these command levers are prevented from simultaneously releasing the corresponding actuating members 223 and 224 when keys 9 and 10 are alternately depressed in rapid sucesssion.

In the embodiment shown in Fig. 10, a somewhat different linkage arrangement from the power actuated levers 223 and 224 to the levers 321 has been selected. For the sake of clarity, Figure 9 illustrates only the corresponding linkage members connected with the levers 223 and 224. Primarily a different shape of the links 316 and 317 of Figure 7 is involved. According to Figure 9, a link 317a replacing the link 317 is connected with the upper end of the lever 321. Connected to the other end of the link 317a is a pin 327 which traverses the range of movement of the levers 223 and 224. It should be noticed that in contrast to link 317, the link 317a is not pivotally connected to the actuating lever 224 but, when released, the lever 224 rotates the lever 321 by means of the pin 327 and thus brings about a rotation of the control shaft 139. The slot 328 in link 317a permits the adjustment of the bolt 323 by means of a slide or push rod 324. The link 316a is, similar to link 316, connected with the lever 223 but it does not engage the lever 321, adjustment of the latter being effected by the pin 327 upon which the lever 223 acts upon release. Figure 9 shows the bolt 323 illustrated in full lines occupying the minus position, whereas the dotted lines indicate the plus position. The turning of the control shaft 139 brings about the engagement of the transmission clutch A and the motor M. Furthermore, according to this embodiment, the control slide 324 is provided with a slot 329 by means of which it straddles a bolt 330 which latter is connected to the lever 321. The slot 329 and the bolt 330 merely serve the purpose of guiding the control slide 324. The operation of the two different embodiments illustrated in Figure 7 and in Figure 10 respectively is precisely the same.

*Safety mechanism*

From the preceding paragraphs it will be clear that for initiating the machine function "calculation" on one hand and for initiating the machine function "carriage shift"

and "clearing" on the other hand, there are provided the two control shafts 139 and 118 which are each adapted to be turned through the intervention of two of the total of four actuating levers 221 to 224. Therefore, with the power control center described so far, it would be possible to block the machine by simultaneously actuating one of the function control keys for calculating and one of the function control keys for carriage shift or clearing of the registers. In order to prevent this, the following safety mechanism has been provided: The control shafts 139 and 118, protruding somewhat beyond the right frame wall, are each provided with a two arm lever as will be particularly clear from Figure 7. More specifically, the shaft 139 has connected thereto a lever 331, while the shaft 118 has connected thereto a lever 332. Furthermore, pivotally mounted on the pivot 333 is a third lever 334 which through a link 335 is connected at 336 with the lower end of the lever 218 shown in Figure 5. Pivotally connected with the pivot 337 on the lever 218 is a link 338 which is pivotally connected at 339 with the longer lever arm of the lever 331. The lever 334 is provided with a locking nose 340. A similar locking nose 341 is arranged on the longer lever arm of the lever 332. The locking nose 340 on the lever 334 is faced by an angled tongue 342 arranged on the shorter lever arm of the lever 332. Similarly, an angled tongue 343 is located opposite the locking nose 341 arranged on the longer lever arm of the lever 332.

The operation of the provided locking mechanism can easily be seen from Figures 7 and 5 respectively. When, for instance, by releasing the actuating lever 221 or 222, the control shaft 118 is turned in clockwise direction, the nose 341 on the lever 332 embraces or locks the tongue 343, the lever 331, thereby preventing a rotational movement of the control shaft 139 for calculation. Similar interlocking action will occur, when after releasing the actuating lever 223 or 224, the control shaft 139 has been turned. In this instance, through the intervention of the link 338, the lever 218 and the link 335, the lever 334 is freed to turn in clockwise direction with regard to Figure 7, so that the locking nose 340 locks the lever 332 through engagement with tongue 342. Thus, the control shaft 118 is now prevented from becoming effective, which control shaft 118, when actuated, is adapted to release the transmission clutch B. Therefore, between the two control shafts 118 and 139, a mutual blocking is effective due to which only one of the functions entered into the machine by function control keys and pertaining to the two groups "calculation" on one hand and "carriage shift" and "clearing" on the other hand can be carried out at one and the same time.

However, since rapid operator manipulation may occasionally result in simultaneous depression of a calculating function control key and a register clearing or shifting control key so as to produce concurrent rotation of control shafts 118 and 139 and blocking of the locking mechanism an additional interlock is provided. Pivotally mounted on a pivot inserted in the frame wall 18 is a two arm lever 344 (Fig. 7). One arm of this lever has its control edge 345 resting in front of a square stud 346 arranged on the longer lever arm of the lever 332. The other lever arm of the lever 344 rests with its bent tongue 358 on an intermediate lever 348 being urged clockwise (Fig. 7) by a spring 347 which latter is connected to a pin likewise mounted on the right side of the frame wall 18. Lever 348 is likewise pivotally mounted on the frame wall 18 and has its longer angled portion 350 held against the two command levers 233 and 234 for plus and minus operations by means of a spring 349 connected to the frame wall 18. The effect of these levers 344 and 348 consists in that, when actuating one of the two function control keys 9 or 10 for plus and minus operations, the control edge 345 moves in front of the stud 346 on the lever 332 and prevents lever 332 from turning in clockwise direction. The effect of this safety arrangement, therefore, consists in that, when simultaneously actuating a key for carriage shift or clearing and a key for calculation, the calculating function will be preferred. The operational sequence first calculating and then carriage shift or clearing, has been selected in view of the automatic division so that the function for the carriage shift, which function follows the calculating operation can be given into the machine either simultaneously with the calculating function or during the calculating operation in order that the function for the carriage transport will be stored until the calculating operation has been completed and will be carried out immediately following the completion of the calculating operation.

In this connection is should be noted that the subdivision of the safety bar system into two levers 344 and 348 has the purpose of permitting release of the block imposed on the control shaft 118 for the carriage shift prior to the completion of a calculating step so that subsequently a function for carriage shift or clearing can be executed when, prior thereto, two function control commands have been entered into the machine. As will be clear from Figs. 5 and 14, the resetting shaft 153 for resetting the power control members 223 and 224 of the control mechanism for calculating is provided with a crank pin 409 which is connected to the arm 410 (Fig. 14) of the locking lever 344 and with each resetting movement moves the lever 344 into its unlocked position. The purpose of this device consists in preventing the control edge of lever 344 from impeding the effective movement of control shaft 118 when the function control keys "calculating," "carriage shift," or "calculating" and "clearing" are actuated in quick succession. In view of the subdivision of the safety lever system into the two levers 348 and 344 and their power locked connection through the spring 349, the pivot 409 is able to move lever 344 into its ineffective position even when the calculating keys for plus and minus calculations are depressed.

A further feature of the power control center according to the invention will likewise be clear from the drawing, particularly Figs. 7 and 9. More specifically, when, while operating the calculating machine, one of the function control keys of the two groups "carriage shift" on one hand and "calculate" on the other hand are depressed simultaneously or nearly simultaneously, this is possible without difficulties. Of the two functions, however, only one is carried out first, and the other is stored. This is brought about by the play in the control bar system since the respective actuating lever of the group 221 to 224 for the stored function is partially released and places itself below the corresponding command lever of the group 231 to 234 so that the actuating lever remains arrested in the partially released position being so held by the interlock of Fig. 7. If, subsequent to the completion of the respective function being carried out, the corresponding control shaft 118 or 139 is restored and the two control shafts are unlocked, the previously released actuating lever is freed to initiate the stored second function. The calculating machine thus works in such a manner that, for instance when simultaneously depressing a key for calculating and transport, first the calculating function and subsequently the function "carriage shift" is carried out. This characteristic of the calculating machine materially simplifies the operation thereof.

*Carriage return mechanism*

As will be clear from Figure 8, the control center may also be used for initiating the carriage return. To this end, the return key 14 is provided with a slide or key stem 351 movable in vertical direction, which slide or key stem is adapted, through a tongue 352, to act upon the command lever 231 for the leftward carriage shift. Furthermore, a slide 353 is movably mounted in the calculating machine. Connected to one end of the slide 353 is a pin 354 upon which the carriage can act shortly before reaching its end position. The other end of the slide 353 is provided with a nose 355 which cooperates with a similar nose 356 on the slide 351. The nose 355 reaches over the nose 356 when the slide 351 is held in its upper adjusted normal position by means of a spring not shown in the drawing. One end of the spring 357 is connected to the slide 353, while its other end is connected to a bearing bar 45. When the key 14 is depressed, the slide 353, due to the spring 357, and thus the pin 354 moves into its left position, while the nose 355 engaging the upper edge of the nose 356 maintains the slide 351 in its lower adjusted position. Consequently, due to the tongue 352 and the function lever 231, the "leftward carriage shift" control mechanism is held released until the carriage has reached its normal position and, by means of the pin 354, has again adjusted the slide 353 so far toward the right that the return key 14 is allowed to return to its normal position.

Division calculation

In the preceding paragraphs it has been described how, by actuating a number of function control keys, several and different functions of the calculating machine can be initiated and executed by the control center according to the invention. In a very similar manner, it is also possible to initiate one or another function in order automatically to carry out certain calculations. The control mechanism shown in the drawing and, particularly, in the total view of Figures 13 and 14 makes it possible in a particular simple and reliable manner to carry out an automatic calculation which will be described in the following paragraphs:

In order to be able by means of a four species calculating machine to carry out an automatic division, it is necessary to have a mechanism which, after entering the dividend into the accumulator of the calculating machine and after entering the divisor into the keyboard, will, with proper position of dividend and divisor, repeatedly subtract the latter until the capacity of the accumulator has been exceeded, resulting from a continuous decimal transfer effected in the accumulator, whereafter only nines appear after a numerical remainder. On the basis of such decimal transfer in the accumulator, which transfer extends to the highest decimal order, an overdraft impulse is initiated which ends the subtracting process, and adds to the accumulator mechanism that value of the divisor which has been subtracted in excess thus again initiating an overdraft impulse resulting from the positive overdraft. The last mentioned impulse initiated movement of the carriage toward the left by one step whereupon the divisor is again repeatedly subtracted from the dividend. This cycle is repeated until the accumulator remainder is smaller than the divisor whereupon the machine has to be stopped. With this method of division, therefore, the control impulses for "minus calculation," "plus calculation," "leftward carriage shift," "minus calculation, plus calculation, leftward carriage shift," etc. have to be transferred to the power control center.

It is also possible to carry out an automatic division in a different sequence, namely, in such a manner that, after the accumulator capacity has been exceeded, as a result of repetitive subtraction, a carriage shift towards the left is carried out, whereupon repetitive addition is performed until the accumulator is overdrafted in a positive direction. Thereupon the carriage must again be adjusted by one indexing step towards the left, and the divisor must be subtracted from the dividend. The automatic division according to the second method has the advantage over the first method in that only half the number of continuous decimal transfers necessary with the other method will occur in the calculating machine so that the division operation will be carried out faster and the machine will be less subject to wear. Figures 11 and 12 illustrate two embodiments of control templates for carrying out an automatic division according to one or the other method.

As will be clear, particularly from Figures 9 and 10, those lever arms of the command levers 231 to 234 which cooperate with the plate-shaped levers 221 to 224 are angled upwardly and are provided with extensions below which a control shaft 359 provided with pins is rotatably mounted. The control shaft 359 is provided with a pin 360 which is located below the command lever 234 for addition and which in its uppermost position lifts the command lever 234 to such an extent that the latter is able to release the corresponding actuating lever 224. The control shaft 359 is furthermore provided with a second pin 361 which in its uppermost position lifts the command lever 233 for subtraction to such an extent that the actuating lever 223 is released. According to the example shown in Figure 11, there is still a third control pin 362 connected with the control shaft 359, which pin in its uppermost position lifts the command lever 231 to such an extent that the latter will release the actuating lever 221 for the leftward carriage shift. According to the embodiment of the control template shown in Figure 11, the control pins are so arranged on the control shaft 359 that in the normal position shown in the drawing, no control pin acts upon the command lever. When, however, the control shaft 359 is rotated by 90° in clockwise direction, first the control pin 361 moves below the corresponding command lever 233 for subtraction. With a further indexing step of the control shaft 359 in clockwise direction, the control pin 360 moves below the corresponding function control lever 234 so that the command addition is transferred to the machine. After a further indexing step in the same direction by 90°, the control pin 362 moves below the command lever 231 as a result of which the leftward carriage shift function is initiated. By means of the control template shown in Fig. 11, it is, therefore, possible to carry out an automatic division with the calculating machine, if, first, care is taken that the control shaft 359 is manually turned in clockwise direction by 90° so that, starting with the minus operation, the division is initiated. The control template shown in Fig. 11, therefore, makes it possible with a proper drive to carry out an automatic division according to the first mentioned method.

However, also the second method of division can easily be realized with the calculating machine according to the invention as will be evident from the embodiment in Figures 9, 10, and 12. In this instance, when rotating control shaft 359 in clockwise direction by 90°, the control pin 361 likewise moves below the command lever 233 as a result of which subtraction will be initiated. When, subsequently, by exceeding the accumulator, a further indexing step of 90° is initiated in clockwise direction, the control pin 362a which is offset by approximately 45° relative to the control pin 361 will temporarily move below the command lever 231 as the result of which leftward carriage shift is initiated. This carriage movement is used for transferring a further indexing step upon the control shaft 359 so that subsequently the control pin 360 will move below the corresponding command lever 234 for initiating addition. When the accumulator is again exceeded, a further rotation of the control shaft in clockwise direction by 90° will occur. As a result of this, the control pin 362b will release the command for leftward carriage shift. This movement of the calculating machine may again be used for rotating the control shaft by a further indexing step so that in the next decade, again a subtraction will occur, etc. The calculating machine will continue this process until in the accumulator, a remainder will appear which is smaller than the divisor. At the end of this calculation, it is merely necessary that the division process conclude with addition and that subsequently the drive is stopped. It will be clear from the preceding paragraphs that, by means of such control templates or pin shafts as illustrated in Figures 10 and 11, the calculating machine can in a very convenient manner carry out an automatic division.

Automatic division

There will now be described the device which is necessary in order to be able to carry out a full automatic division by means of the control template shown in Figure 12 and by means of the control center according to the invention. To this end, the control shaft 359 is provided with a disc 363 (Figs. 6 and 14) which in its turn is provided with four shift pins 365. These shift pins are effective to give the control shaft 359 four different stable positions. This is effected by means of a lever 367 which is pivotally connected at 366 and which by means of a spring 368 is held against two of the pins 365.

Figure 14:
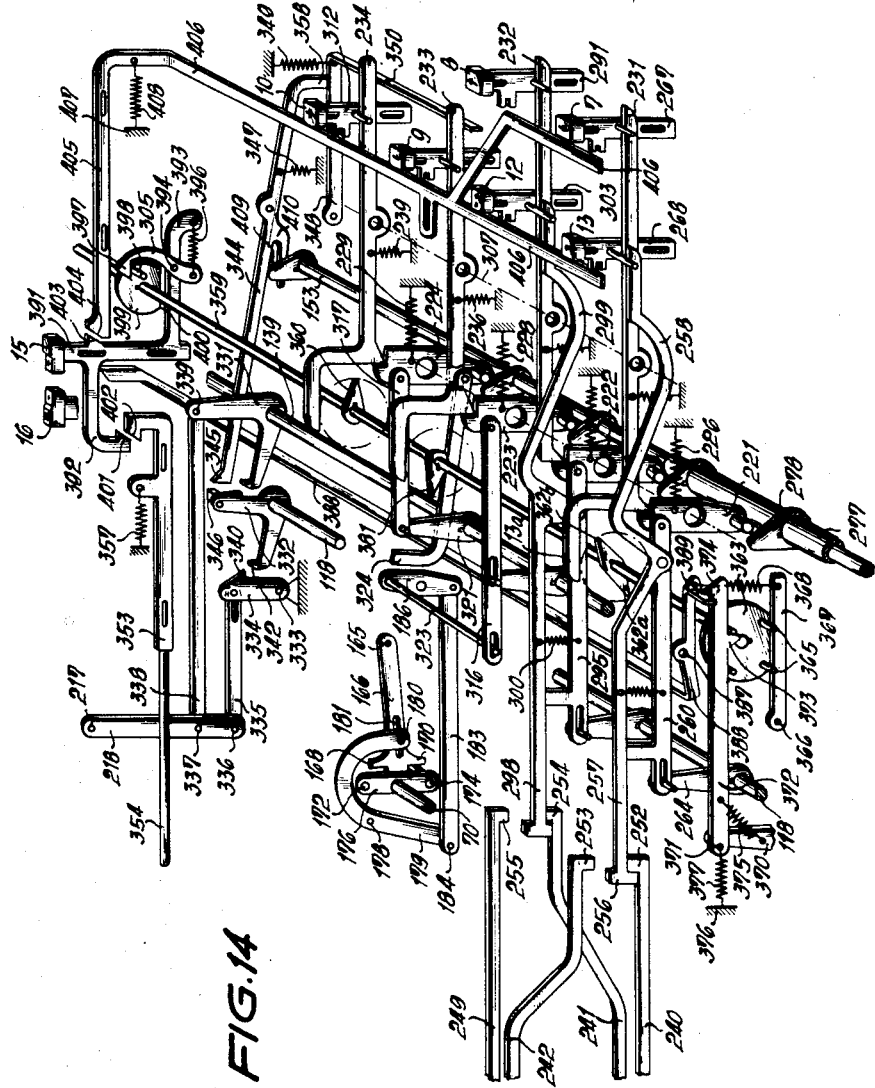
Fig. 14 is a perspective diagrammatic and expanded view of the control mechanism of the calculating machine according to the invention.

In order to index the control shaft 359, there is provided the following device. On the control shaft 118 for releasing the transmission clutch B and for switching on the motor, a bail 369 is pivotally mounted. The right hand end of this bail carries an upstanding integral arm 370 at the end of which at 371 there is tiltably mounted a control pawl 372. The control pawl 372 carries an indexing nose 373 which is directed downwardly while at the right hand end of said control pawl 372 there is provided a locking nose 374 directed upwardly. Furthermore, a spring 375 is effective between the arm 370 and the pawl 372 which spring has the tendency to turn the pawl 372 in clockwise direction. A spring 377 connected at 376 to the machine frame, is connected at 371 to the lever 370 and has the tendency to turn the arm 370 in counter-clockwise direction. The other side of the bail 369 has a substantially horizontal lever 378 to one end of which at 379 a link 380 is connected which in its turn at 381 is connected to two arm lever 382. The lever 382 is pivotally mounted on the pin 383 on the machine frame and has its other end provided with a pivot carrying a roller 384. This roller, as will be explained later, may be moved into the path of an indexing cam 385 which is displaceably mounted on the last shorter driving shaft 49a driven by the main calculating shaft. Cam 385 is through the intervention of a connecting rod rod 415 coupled to a member 412 which carries the tens transfer tooth 413 and is displaceable by the forked lever 81. Furthermore, the bail 369 carries a lever 386 the end of which may be moved into the path of the pin 112 which is connected to the disc 106 of the transmission clutch B and protrudes from the backside of said disc. The front end of this pin 112 carries the clutch pawl 113 mentioned above. A two arm latch lever 388 is pivotally mounted on the pivot 387. The right lever arm of the lever 388 is provided with an angled tongue 389 behind which the locking nose 374 of the pawl 372 will catch; a spring 368 mentioned above is connected to tongue 389 in order to hold the lever 388 in its clockwise moved position (Figures 6 and 14).

A key 15 is provided for initating an automatic division. This key is carried by a key stem 391 which is held in its ineffective position by a spring 390 shown in Fig. 5 only. The key stem is, in a manner known per se, by means of slots longitudinally movable in the machine frame. An arm 392 of the key stem 391 projects beyond the lever arm 388 which is held against arm 392 by the above mentioned spring 368. An indexing pawl 395 is pivotally connected at 394 to a further arm 393 of the key stem 391. The indexing pawl 395 is held by means of a spring 396 in its counter-clockwise (with regard to Fig. 4) moved position. The upper lever arm of the lever 395 carries an indexing nose 397 adapted to act upon the pin 398. The pin 398 is arranged on a disc 399 which is rigidly connected to the control shaft 359. One side of the disc 399 has a segment cut off at 400. The arm 392 of the key stem 391 is provided with a locking nose 401 by means of which the key shaft 391 is adapted to be locked in depressed position by the angled part 402 of the control slide 353. The slide 353 has been described in connection with the description of the carriage return movement and has been illustrated in Figure 8. The key stem 391 is furthermore provided with a slant surface 403 adapted to act upon a cam surface 404 on a latch slide 405, which is guided in a manner known per se by slots and pins on the machine frame. The slide 405 is operatively connected with a locking plate 406 which is held in its leftward displaced position by a spring 408 one end of which is connected at 407 to the machine frame. For the sake of clarity, Figures 8 and 14 show the locking plate 406 only as consisting of individual integrally connected strips.

When the division mechanism is in its normal, idle position, the key stem 391 of key 15 is in its normal undepressed position under the influence of a spring 390 shown only in Fig. 5. As illustrated in Fig. 14, in normal position, the parts 401 and 402 are unlocked, and the slide 405 is, due to the spring 408, in its unlocked position, while the segmental surface 400 of the disc 399 engages the arm 393. Furthermore, the lever 388 is turned in clockwise direction by the spring 368 so that the tongue 389 through the intervention of the locking nose 374 holds the pawl 372 in the advanced position shown in Fig. 14. In this position, the roller 384 connected to the two arm lever 382 is spaced below the transfer cam 385 so that the cam 385 will not engage the roller 384 even when a continuous decimal transfer is effective in the accumulator at which transfer the cam is displaced in the direction of the arrow a.

If with the device described, an automatic division is to be effected, it is necessary to depress the key 15 and to depress the key 16 for reversing the revolutions counter relative to the accumulator, whereupon the following steps will be carried out:

First, the locking plate 406 is moved through the intervention of the slant surfaces 403 and 404 and the slide 405, whereby the function control keys for addition, subtraction carriage shift, clearing and, as will be evident from Figure 8, also for the return movement will be locked. The division key is locked against return movement by engagement of latch nose 402 with the locking nose 401. Furthermore, the upwardly angled end of the two arm lever 388 is turned about the pivot 387 in counter-clockwise direction against the thrust of the spring 368, whereby the tongue 389 disengages the locking nose 374. Due to the thrust of the spring 377, the bail 369 is now adjusted in counter-clockwise direction so that via link 380 the two arm lever 382 is turned in clockwise direction (Fig. 13) to such an extent that the roller 384 moves upwardly to such a degree that the indexing cam 385 in its left adjusted position is adapted through roller 384 to act upon the bail 369. Furthermore through lever arm 393, the indexing nose 397 on lever 395, and the pin 398 connected to the disc 399, the control shaft 359 is turned by one indexing step, i.e., by 90° in clockwise direction, so that, as described in connection with Figs. 11 and 12, the control pin 361 moves below the corresponding command lever 233 for subtraction. The divisor is subtracted from the dividend until in the respective decimal orders, the capacity of the accumulator is exceeded and a continuous decimal transfer is effected. For purposes of carrying out this operation, the dividend is placed over the divisor in such a way that the first digits of dividend and divisor are located above each other. Upon overdraft resulting from the continuous decimal transfer, the tens transfer finger 79 tilts the fork-shaped lever 81 whereby lever 81 moves member 412, which is displaceable on square shaft 49a and carries the shift tooth 413, into the range of tooth 414 connected to shaft 53. Since indexing cam 385 is coupled to member 412 through the intervention of connecting rod 415, it will be apparent that with a tens transfer in the preceding decimal order, the indexing cam 385 together with member 412 will be moved in the direction of the arrow *a* by the preceding decimal order of the accumulator so that the roller 384 mounted on a pivot of the lever 382 will now be located in the path of movements of the indexing cam 385. Thus, at the end of this continuous decimal transfer, the lever 382 is rocked in counter-clockwise direction with regard to Fig. 13. As a result thereof, the indexing pawl 372 is operatively advanced through the intervention of the bail 369 and thus by engagement of the nose 373 behind one of the pins 365, the control shaft is turned in clockwise direction by 90°. In the course of this turning movement, the control pin 362a moves momentarily, below the command lever 231 for leftward carriage shift so that subsequently a carriage step toward the left is carried out by the machine. Shortly before the completion of this carriage step, the indexing pawl 372 is again advanced through the intervention of pivot 112 which protrudes from the disc 106 and engages the lever 386 connected with the bail 369. Consequently, the control shaft shown in Fig. 12 adjusts indexing pin 360 to an upwardly directed vertical position to initiate addition. Now, the calculating machine carries out a number of additions until a continuous decimal transfer up to the last decimal order of the accumulator occurs and the indexing cam 385 is adjusted to impart a second impulse upon the indexing pawl 372 by means of the roller 384 so that the control shaft 359 is turned by an additional 90°. During this operation the indexing pin 362b becomes effective so that subsequently the carriage is moved toward the left by one decimal position. During this carriage shift, the control shaft 359 is turned once more by 90° through lever 386 so that the calculating machine again subtracts. This operational sequence repeats itself until the carriage reaches its normal leftmost position. In this position the carriage has moved the slide 353 toward the right through the intervention of the pin 354 so that the parts 401 and 402 are unlocked.

The key stem 391 of key 15 is adapted at this stage of the division calculation to return to its basic or normal position, only if as last calculation addition has been carried out by the machine and when the segment-shaped portion of the disc 399 is located directly above the arm 393 on the key stem 391. When the calculating machine, after the carriage has reached its normal position, is operating in addition, this process is continued until a continuous decimal transfer is effected in the accumulator. The impulse released thereby rotates the pin shaft once more in clockwise direction by 90° so that now the surface 400 of the disc 399 is opposed to the arm 393 on the key stem 391, and, in view of the effected unlocking of the key stem by parts 401 and 402, the key now returns to its starting position. As a result thereof, also the two arm lever 388, urged by the spring 368, returns to its normal position so that the locking nose 374 of the indexing pawl 372 is latched by the tongue 389. During this last indexing step of the control shaft 359, once more a carriage shift command is entered into the calculating machine through the intervention of the control pin 362b. Although this shifting operation is being carried out, it remains without effect in view of the obtained normal position of the carriage and in view of the free wheeling provided on the carriage in a manner known per se. No further indexing impulse is transferred to the control shaft 359 through pin 112 on the disc 106 and lever arm 386, because due to the interlocking of the indexing pawl 372 and the tongue 389, the lever 386 has reached its switch-off position. In this position, as mentioned above, the roller 384 carried by lever 382 has been turned counter clockwise to such an extent that the indexing cam 385 cannot operatively engage the indexing pawl 372. In view of the fact that the key stem 391 has returned, the locking plate 406, on slide 405, has been returned to its starting position by the spring 408, so that now the calculating machine keys are again released for any desired actuation.

When the calculating machine, at the time the carriage reaches its normal position, is subtracting, this process is likewise continued until a continuous decimal transfer is effected in the accumulator mechanism, and the control shaft 359 is once more turned by 90°. The "leftward carriage shift" subsequently caused by the control cam 362a remains without effect in view of the free wheeling on the carriage. The rocking of the lever arm 386 by means of the output side of the clutch B furthermore brings about another indexing step of the control shaft, so that now the control pin 360 for plus calculation lifts the corresponding command lever 234 and once more initiates addition. In view of a further extended tens transfer caused thereby, another indexing step is effected which moves the control shaft to its starting position in which the segmental surface 400 of disc 399 occupies its lowermost horizontal position. In this position of the control shaft 359, the key stem 391 can return to its normal position so that the arm 393 will abut the segmental surface 400. The division calculation is thus concluded with addition, while in the accumulator a remainder will be obtained which is smaller than the divisor. The return of the key stem 391 now brings about a turning movement of the lever 388 in clockwise direction so that the tongue 389 moves into the range of movement of the locking nose 374 and causes the nose of the indexing pawl 372 to catch behind the tongue 389 whereby the control bars for effecting rotation of control shaft 359 move into their ineffective position. Furthermore, also the slide 405 connected with the locking plate 406 is moved into its starting position by the spring 408. Subsequent to the initiation of addition by means of the control pin 360, another carriage shift had been initiated by control pin 362b, which function likewise has no effect in view of the fact that the carriage has reached its end position. The interlocking of indexing pawl 372 with lever 388, 389 which had occurred in the meantime, has moved indexing arm 386 out of the operative range of clutch B. The dividing operation is thus finished, and the machine is again in its inactive position.

If it is intended to bring about an automatic division according to the first mentioned method by means of the control shaft diagrammatically illustrated in Fig. 11, this can be carried out with the same mechanism. In view of the modified operational sequence, namely, repeated subtraction, corrective addition, left carriage shift, and the four present indexing positions of the control shaft, it is merely necessary during the carriage shift operation to operate indexing pawl 372 twice so that subtraction will be initiated subsequent to the shift operation. These two indexing steps of the control shaft may be effected in a simple manner by providing the disc 106 of the transmission clutch B with a second pin which is offset relative to the pin 112 by approximately 180° and which brings about an indexing step of the shaft 359 through the intervention of the lever 386.

With this division method, and after the carriage has reached its end position, the control always works in such a manner that subtraction is initiated. When during this operation the capacity of the accumulator is exceeded, a continuous decimal transfer is effected in the accumulator. This overdraft signal subsequently initiates addition which in its turn again brings about a continuous decimal transfer and further rotation of the control shaft 359. In this position, the control shaft initiates carriage shift operation which however remains without effect in view of the fact that the carriage has reached its normal position. However, through pin 112 and lever 386, once more an impulse is transferred to the control shaft 359 so that the latter reaches its end position in which the key 15 is free to return to its normal position. The operations carried out during this terminating process are precisely the same as those described in connection with the previously described division process.

From the preceding description of the calculating machine, it will be evident that the actuating levers 221 and 222 are provided for initiating carriage shift and clearing operations and that the actuating levers 223, 224 in the control center are provided for initiating addition and subtraction. The first two mentioned actuating levers are returned to their normal positions through the intervention of an eccentric 272, 273 from the output side of the transmission clutch B. The resetting pawls 325 are intended for resetting the two actuating levers 223 and 224, said pawls 325 being connected with the resetting shaft 153. As has been described, particularly in connection with Figure 2, when the main calculating shaft 27 is rotated, the resetting shaft 153 is moved by means of a curve disc 148 rigidly connected to the shaft 27, said movement being effected only shortly before the end of the rotation of the main calculating shaft. In this way, when carrying out a dividing calculating operation, the two actuating levers 223 and 224 are restored to and held in their reset positions by means of their resetting levers at the time in the cycle when an extended tens transfer occurs and has rotated the control shaft 359 whereby the just released command lever 233 or 234 locks the actuating lever 223 or 224 in its starting position. Thus, the calculating machine is prevented from carrying out further addition or subtraction. Consequently, directly following an overdraft, rotation of the control shaft and thus, subsequent to a calculating operation, a carriage shift is effected.

It is, of course, understood that the present invention is, by no means, limited to the particular arrangement shown in the drawings but also comprises any modifications within the scope of the appended claims.

What we claim is:

1. In a calculating machine having a frame, a motor, a carriage shiftable transversely relative to said frame, a register supported in said carriage, carriage shifting mechanism for shifting said carriage, a normally disengaged power transmission mechanism connecting said carriage shifting mechanism to said motor, first control means operable to engage said transmission mechanism to effect transverse shifting of the carriage in either direction, a register normalizing device, a normally disengaged clutch means interposed between said device and said motor, second control means associated with said clutch means and operable to engage said clutch means to effect resetting of said register, a spring power operated control member movable from an ineffective to an effective position for engaging said transmission mechanism and said clutch selectively, the combination of: coupling lever means arranged on said control member and adjustable for selectively connecting said control member to one of said control means, yielding means for holding said coupling lever means in connecting engagement with one of said control means, latch means normally engaging said control member for holding the same in ineffective position, manually operable keys operatively connected with said latch means and operable individually for disengaging said latch means from said control member, and means connected to one of said keys adjusting said coupling lever means to couple the other one of said control means to said control member prior to disengagement of said latch means from said control member.

2. In a calculating machine having a motor, a differential actuator, a first normally disengaged power transmission mechanism for connecting said motor to said actuator, an accumulator carriage shiftable transversely with respect to said actuator, a carriage shifting mechanism for shifting said carriage, a second normally disengaged power transmission mechanism for connecting said motor to said carriage shifting mechanism, first control means for selectively connecting said motor to or disengaging the same from said actuator for selectively controlling positive or negative operation of said actuator, second control means for selectively engaging and disengaging said second power transmission mechanism to connect said motor to said carriage shifting mechanism for selectively effecting right or left carriage shift, the combination of: four spring-biased control members continuously urged to move from an ineffective to an effective position, a first one of said control members being operable to actuate said first control means to connect said motor to said actuator for effecting a positive operation of said actuator, a second one of said control members being operable to actuate said first control means to connect said motor to said actuator for effecting a negative operation of said actuator, a third one of said control members being operable to actuate said second control means to connect said motor to said carriage shifting mechanism for effecting a right carriage shift, and the fourth one of said control members being operable to bring about actuation of said second control means to connect said motor to said carriage shifting mechanism for effecting a left carriage shift, four latch means respectively normally holding said control members in ineffective position, manually operable keys respectively operatively connected to said latch means and operable selectively to disengage one of said control members, first resetting means connected to said first power transmission mechanism for resetting to ineffective position said first and second control means during the performance of a machine cycle of said actuator, second resetting means connected to said second power transmission mechanism for resetting to ineffective position said third and fourth control members during the performance of a machine cycle of said carriage shifting mechanism, first locking means interposed between said first and second control means for locking one of said resetting means in ineffective position when the other one is in effective position, second locking means interposed between said keys associated with said first and second and said third and fourth control members for respectively selectively locking two of said keys in ineffective position when the respective other two keys are in their effective position.

3. A calculating machine according to claim 2, which includes a first control shaft operable by two of said control members, a second control shaft operable by the other two of said control members, locking means interposed between said first and said second control shafts for selectively locking one of said shafts when the other is in its effective position, each of said locking means being provided with such a play that the latch means of two of said spring-biased operable control members are disengaged and a spring-biased operable control member of the other two control members is released by said latch means, said last mentioned spring-biased operable control member being adjustable in effective direction by an amount sufficient to keep the respective latch means in disengaged position.

4. A calculating machine according to claim 2, which includes: first supporting means common to all of said spring-biased operable control members for supporting said control members in close side by side arrangement, and second supporting means common to all of said latch means for supporting the latter in close side by side arrangement in the machine.

5. A calculating machine according to claim 2, which includes a cyclically operable mechanism movable from an ineffective to a plurality of fixed effective positions: first cam means connected to said cyclically operable mechanism and operable to disengage said latch means for effecting operation of said actuator and said carriage, said carriage having a register including a tens carrying mechanism and being shiftable transversely with regard to said actuator, second cam means adjustable by said tens carrying mechanism and operable by said actuator, pin means connected to said second power transmission mechanism, lever means arranged in operative connection with said second cam means and said pin means, third locking means to hold said lever means in an ineffective position, shift means connected to said lever means and adapted to move said cyclically operable mechanism in a predetermined sequence of operable positions, and key means operable to disengage said third locking means for bringing said lever means and said shift means into an effective position.

6. In a calculating machine having a motor, a differential actuator, a first normally disengaged power transmission mechanism for connecting said motor to said actuator, an accumulator carriage shiftable transversely with respect to said actuator, a carriage shifting mechanism for shifting said carriage, a second normally disengaged power transmission for connecting said motor to said carriage shifting mechanism, first control means for selectively connecting said motor to or disconnecting the same from said actuator and selectively controlling positive and negative operation of said actuator, second control means for engaging and disengaging said second power transmission mechanisms to connect said motor to said carriage shifting mechanism and controlling right and left carriage shift, four spring power operated control members, spring means respectively associated with said control members, each of said control members being movable from an ineffective to an effective position by the respective spring means pertaining thereto, one of said control members being operable to actuate said first control means to connect said motor to said actuator for controlling a positive operation of said actuator, a second one of said control members being operable to actuate said first control means to connect said motor to said actuator for controlling a negative operation of said actuator, a third one of said control members being operable to actuate said second control means to connect said motor to said carriage shifting mechanism for controlling a right carriage shift, the fourth one of said control members being operable to bring about actuation of said second control means to connect said motor to said carriage shifting mechanism for controlling a left carriage shift; latch means respectively normally holding said control members in ineffective position, first resetting means connected with said first power transmission mechanism for resetting said first and second control member during the performance of a machine cycle of said actuator, second resetting means connected with said second power transmission mechanism for resetting said third and fourth control members during the performance of a machine cycle of said carriage shifting mechanism, the combination of: a tens carrying mechanism in said actuator, first cam means adjustable by said tens carrying mechanism and operable by said actuator, pin means connected to said second power transmission mechanism, a cyclically operable mechanism movable from an ineffective position to a plurality of fixed effective positions, second cam means connected to said cyclically operable mechanism and operable to disengage said latch means to effect operations of said actuator and said carriage, lever means arranged in operative connection with said first cam means and said pin means, locking means to hold said lever means in an ineffective position, shift means connected with said lever means and operable to move said cyclically operable mechanism successively into operative positions, and key means operable to disengage said locking means to thereby bring said lever means and said shift means into effective position.

7. A calculating machine according to claim 6, which includes means for holding said cyclically operable mechanism in one ineffective and three effective positions, said second cam means being arranged successively to effect minus calculation, plus calculation and left carriage shift, two pin means mounted on said second power operable transmission mechanism and operable to perform two shifts of the cyclically operable mechanism during a cycle of carriage shift, to move the cyclically operable mechanism through the inactive position again into the position for minus calculation.

8. A calculating machine according to claim 6, which includes means for holding said cyclically operable mechanism in four fixed positions, said second cam means being mounted on said mechanism and being operable successively to effect a plurality of minus calculations, one left carriage shift, a plurality of plus calculations and one left carriage shift.

9. A calculating machine according to claim 6, in which said cyclically operable mechanism includes a rotatable control shaft, and in which said pin means comprises two pairs of control pins connected to said control shaft, the control pins of one pair being offset with regard to the control pins of the other pair by an angle of less than 90°.

References Cited in the file of this patent
UNITED STATES PATENTS

| | | |
|---|---|---|
| 2,117,620 | Mathi | May 17, 1938 |
| 2,152,199 | Machado | Mar. 28, 1939 |
| 2,252,621 | Eichler | Aug. 12, 1941 |
| 2,294,111 | Friden | Aug. 25, 1942 |
| 2,366,345 | Machado | Jan. 2, 1945 |
| 2,416,809 | Avery | Mar. 4, 1947 |
| 2,500,346 | Christian et al. | Mar. 14, 1950 |
| 2,531,207 | Gang | Nov. 21, 1950 |
| 2,546,884 | Britten | Mar. 27, 1951 |
| 2,552,789 | Hopkins | May 15, 1951 |
| 2,780,411 | Kiel et al. | Feb. 5, 1957 |

FOREIGN PATENTS

| | | |
|---|---|---|
| 171,380 | Austria | May 26, 1952 |